United States Patent
Sanghi et al.

(10) Patent No.: US 11,176,064 B2
(45) Date of Patent: Nov. 16, 2021

(54) METHODS AND APPARATUS FOR REDUCED OVERHEAD DATA TRANSFER WITH A SHARED RING BUFFER

(71) Applicant: Apple Inc., Cupertino, CA (US)

(72) Inventors: Karan Sanghi, San Jose, CA (US); Saurabh Garg, San Jose, CA (US); Vladislav V. Petkov, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/588,557

(22) Filed: Sep. 30, 2019

(65) Prior Publication Data

US 2020/0026668 A1    Jan. 23, 2020

Related U.S. Application Data

(63) Continuation of application No. 15/984,153, filed on May 18, 2018, now Pat. No. 10,430,352.

(51) Int. Cl.
| | |
|---|---|
| *G06F 13/16* | (2006.01) |
| *G06F 12/0831* | (2016.01) |
| *G06F 15/167* | (2006.01) |
| *G06F 15/173* | (2006.01) |

(52) U.S. Cl.
CPC ...... *G06F 13/1657* (2013.01); *G06F 12/0835* (2013.01); *G06F 15/167* (2013.01); *G06F 15/17375* (2013.01)

(58) Field of Classification Search
None
See application file for complete search history.

(56) References Cited

U.S. PATENT DOCUMENTS

| | | |
|---|---|---|
| 4,805,137 A | 2/1989 | Grant et al. |
| 4,949,299 A | 8/1990 | Pickett |
| 4,987,529 A | 1/1991 | Craft et al. |
| 5,367,688 A | 11/1994 | Croll |
| 5,467,459 A | 11/1995 | Alexander et al. |

(Continued)

FOREIGN PATENT DOCUMENTS

| | | |
|---|---|---|
| EP | 3013008 A1 | 4/2016 |
| JP | 2004086792 A | 3/2004 |

(Continued)

OTHER PUBLICATIONS

ECN L1 PM Substates with CLKREQ approved Aug. 23, 2012.

(Continued)

*Primary Examiner* — Elias Mamo
(74) *Attorney, Agent, or Firm* — Sterne, Kessler, Goldstein & Fox P.L.L.C.

(57) ABSTRACT

Methods and apparatus for reducing bus overhead with virtualized transfer rings. The Inter-Processor Communications (IPC) bus uses a ring buffer (e.g., a so-called Transfer Ring (TR)) to provide Direct Memory Access (DMA)-like memory access between processors. However, performing small transactions within the TR inefficiently uses bus overhead. A Virtualized Transfer Ring (VTR) is a null data structure that doesn't require any backing memory allocation. A processor servicing a VTR data transfer includes the data payload as part of an optional header/footer data structure within a completion ring (CR).

20 Claims, 15 Drawing Sheets

(56) References Cited

U.S. PATENT DOCUMENTS

| | | | |
|---|---|---|---|
| 5,485,578 | A | 1/1996 | Sweazey |
| 5,613,086 | A | 3/1997 | Frey et al. |
| 5,659,542 | A | 8/1997 | Bell et al. |
| 5,708,779 | A | 1/1998 | Graziano et al. |
| 5,731,973 | A | 3/1998 | Takaishi et al. |
| 5,850,395 | A | 12/1998 | Hauser et al. |
| 5,903,564 | A | 5/1999 | Ganmukhi et al. |
| 5,943,507 | A | 8/1999 | Cornish et al. |
| 6,212,566 | B1 | 4/2001 | Vanhoof et al. |
| 6,216,178 | B1 | 4/2001 | Stracovsky et al. |
| 6,233,702 | B1 | 5/2001 | Bunton et al. |
| 6,260,152 | B1 | 7/2001 | Cole et al. |
| 6,359,863 | B1 | 3/2002 | Varma et al. |
| 6,411,997 | B1 | 6/2002 | Dawes et al. |
| 6,434,633 | B1 | 8/2002 | Braun et al. |
| 6,523,073 | B1 | 2/2003 | Kammer et al. |
| 6,553,446 | B1 | 4/2003 | Miller |
| 6,693,895 | B1 | 2/2004 | Crummey et al. |
| 6,735,642 | B2 * | 5/2004 | Kagan ............. G06F 13/28 710/22 |
| 6,947,442 | B1 | 9/2005 | Sato et al. |
| 6,948,094 | B2 | 9/2005 | Schultz et al. |
| 6,990,594 | B2 | 1/2006 | Kim et al. |
| 7,099,949 | B1 | 8/2006 | Vanhoof et al. |
| 7,100,020 | B1 | 8/2006 | Brightman et al. |
| 7,127,600 | B2 | 10/2006 | Zimmer et al. |
| 7,191,240 | B1 | 3/2007 | Johnson |
| 7,281,172 | B2 | 10/2007 | Chujo |
| 7,397,774 | B1 | 7/2008 | Holland et al. |
| 7,398,382 | B2 | 7/2008 | Rothman et al. |
| 7,506,084 | B2 | 3/2009 | Moerti et al. |
| 7,509,391 | B1 | 3/2009 | Chauvel et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,681,012 | B2 | 3/2010 | Verm et al. |
| 7,685,476 | B2 | 3/2010 | Andre et al. |
| 7,802,256 | B2 | 9/2010 | Havens et al. |
| 7,813,366 | B2 * | 10/2010 | Freimuth ............. G06F 13/4282 370/419 |
| 7,853,731 | B1 | 12/2010 | Zeng |
| 7,864,720 | B2 | 1/2011 | Jeyaseelan |
| 7,899,941 | B2 | 3/2011 | Hendry et al. |
| 7,908,335 | B1 | 3/2011 | Citterelle et al. |
| 7,941,682 | B2 | 5/2011 | Adams |
| 7,957,777 | B1 | 6/2011 | Vu et al. |
| 8,230,248 | B2 | 7/2012 | Dance et al. |
| 8,255,725 | B2 | 8/2012 | Shimazaki et al. |
| 8,265,092 | B2 * | 9/2012 | Craddock ........... G06F 13/4022 370/412 |
| 8,310,965 | B1 | 11/2012 | Zhang |
| 8,352,624 | B2 | 1/2013 | Zimmerman et al. |
| 8,359,449 | B2 * | 1/2013 | Accapadi ............. G06F 12/08 711/170 |
| 8,422,404 | B2 | 4/2013 | Taki |
| 8,468,285 | B2 | 6/2013 | Kobayashi |
| 8,555,099 | B2 | 10/2013 | Marinkovic et al. |
| 8,600,820 | B2 * | 12/2013 | Hoffman ............. G07F 17/0042 705/26.2 |
| 8,635,412 | B1 | 1/2014 | Wilshire |
| 8,656,228 | B2 | 2/2014 | Check et al. |
| 8,756,601 | B2 * | 6/2014 | Plondke ............. G06F 9/4856 718/1 |
| 8,769,168 | B2 | 7/2014 | Moertl et al. |
| 8,788,822 | B1 | 7/2014 | Riddle |
| 8,799,537 | B1 | 8/2014 | Zhu et al. |
| 8,808,091 | B2 | 8/2014 | Shaw et al. |
| 8,819,386 | B1 | 8/2014 | Mather |
| 8,832,331 | B2 | 9/2014 | Co |
| 8,848,809 | B2 | 9/2014 | Whitby-Strevens |
| 8,862,923 | B1 | 10/2014 | Leung et al. |
| 8,914,649 | B2 | 12/2014 | So et al. |
| 9,021,275 | B1 | 4/2015 | Greenan et al. |
| 9,152,580 | B1 | 10/2015 | Chau et al. |
| 9,170,957 | B2 | 10/2015 | Touzni et al. |
| 9,280,360 | B2 | 3/2016 | Xu et al. |
| 9,319,090 | B2 | 4/2016 | Whitby-Strevens |
| 9,356,844 | B2 * | 5/2016 | Kim ............. H04L 43/026 |
| 9,544,069 | B2 | 1/2017 | Whitby-Strevens et al. |
| 9,547,535 | B1 | 1/2017 | Wilt |
| 9,568,970 | B1 | 2/2017 | Kaushal et al. |
| 9,582,448 | B2 | 2/2017 | Saitou |
| 9,594,718 | B2 | 3/2017 | Kaushik et al. |
| 9,628,211 | B1 | 4/2017 | Stoler |
| 9,769,756 | B1 | 9/2017 | Cui et al. |
| 9,830,289 | B2 | 11/2017 | Pulyala et al. |
| 9,910,475 | B2 | 3/2018 | Kurts et al. |
| 9,913,305 | B2 | 3/2018 | Pinheiro et al. |
| 9,946,325 | B2 | 4/2018 | Leucht-Roth et al. |
| 9,959,124 | B1 | 5/2018 | Herbeck et al. |
| 10,078,361 | B2 | 9/2018 | Sanghi et al. |
| 2002/0013821 | A1 | 1/2002 | Kasper |
| 2002/0013868 | A1 | 1/2002 | West |
| 2002/0044553 | A1 | 4/2002 | Chakravorty |
| 2002/0065867 | A1 | 5/2002 | Chauvel |
| 2002/0169938 | A1 | 11/2002 | Scott et al. |
| 2003/0014607 | A1 | 1/2003 | Slavin et al. |
| 2003/0086122 | A1 | 5/2003 | Parry |
| 2003/0099221 | A1 | 5/2003 | Rhee |
| 2003/0112758 | A1 | 6/2003 | Pang |
| 2003/0200413 | A1 | 10/2003 | Gurumoorthy et al. |
| 2004/0044929 | A1 | 3/2004 | Chujo |
| 2004/0064589 | A1 | 4/2004 | Boucher et al. |
| 2004/0128568 | A1 | 7/2004 | O'Shea |
| 2004/0179546 | A1 | 9/2004 | McDaniel et al. |
| 2004/0201749 | A1 | 10/2004 | Malloy |
| 2004/0221056 | A1 | 11/2004 | Kobayashi |
| 2004/0228365 | A1 | 11/2004 | Kobayashi |
| 2004/0268172 | A1 | 12/2004 | Kates |
| 2005/0033947 | A1 | 2/2005 | Morris |
| 2005/0076122 | A1 | 4/2005 | Khawand et al. |
| 2005/0076196 | A1 | 4/2005 | Zimmer et al. |
| 2005/0108385 | A1 | 5/2005 | Wechter et al. |
| 2005/0114620 | A1 | 5/2005 | Justen |
| 2005/0117601 | A1 | 6/2005 | Anderson et al. |
| 2005/0149711 | A1 | 7/2005 | Zimmer et al. |
| 2005/0157781 | A1 | 7/2005 | Ho et al. |
| 2005/0285862 | A1 | 12/2005 | Noda et al. |
| 2006/0039285 | A1 | 2/2006 | Chapman et al. |
| 2006/0047989 | A1 | 3/2006 | Delgado et al. |
| 2006/0075269 | A1 | 4/2006 | Liong et al. |
| 2006/0107071 | A1 | 5/2006 | Girish et al. |
| 2006/0218301 | A1 | 9/2006 | O'Toole et al. |
| 2006/0259799 | A1 | 11/2006 | Melpignano et al. |
| 2007/0005869 | A1 | 1/2007 | Balraj et al. |
| 2007/0043901 | A1 | 2/2007 | Wu et al. |
| 2007/0070997 | A1 | 3/2007 | Weitz et al. |
| 2007/0180041 | A1 | 8/2007 | Suzuoki |
| 2007/0201492 | A1 | 8/2007 | Kobayashi |
| 2007/0226417 | A1 | 9/2007 | Davis |
| 2007/0286246 | A1 | 12/2007 | Kobayashi et al. |
| 2008/0010563 | A1 | 1/2008 | Nishimura |
| 2008/0046689 | A1 | 2/2008 | Chen et al. |
| 2008/0077816 | A1 | 3/2008 | Ravichandran |
| 2008/0183931 | A1 | 7/2008 | Verm et al. |
| 2008/0231711 | A1 | 9/2008 | Glen et al. |
| 2008/0235355 | A1 | 9/2008 | Spanier et al. |
| 2008/0244259 | A1 | 10/2008 | Zimmer et al. |
| 2008/0301148 | A1 | 12/2008 | Lee et al. |
| 2009/0024924 | A1 | 1/2009 | Kim |
| 2009/0083560 | A1 | 3/2009 | O'Connell et al. |
| 2009/0113141 | A1 | 4/2009 | Bullman et al. |
| 2009/0133016 | A1 | 5/2009 | Brown et al. |
| 2009/0138650 | A1 | 5/2009 | Lin et al. |
| 2009/0177847 | A1 | 7/2009 | Ceze et al. |
| 2009/0189442 | A1 | 7/2009 | Chi |
| 2009/0225818 | A1 | 9/2009 | Dapper et al. |
| 2009/0282050 | A1 | 11/2009 | Thomas et al. |
| 2009/0282088 | A1 | 11/2009 | Thomas et al. |
| 2009/0310618 | A1 | 12/2009 | Carter |
| 2009/0327074 | A1 | 12/2009 | Callaway, Jr. et al. |
| 2010/0017655 | A1 | 1/2010 | Gooding et al. |
| 2010/0027729 | A1 | 2/2010 | Murphy |

(56) References Cited

U.S. PATENT DOCUMENTS

| | | |
|---|---|---|
| 2010/0030932 A1 | 2/2010 | Ergas et al. |
| 2010/0082859 A1 | 4/2010 | Hendry et al. |
| 2010/0097931 A1 | 4/2010 | Mustafa |
| 2010/0098419 A1 | 4/2010 | Levy et al. |
| 2010/0161959 A1 | 6/2010 | Sood |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276695 A1 | 11/2011 | Maldaner |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0066523 A1 | 3/2012 | Kobayashi |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0120959 A1 | 5/2012 | Krause |
| 2012/0124252 A1 | 5/2012 | Kayama et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0166943 A1 | 6/2013 | Song et al. |
| 2013/0188544 A1 | 7/2013 | Tiwari et al. |
| 2013/0290947 A1 | 10/2013 | Li |
| 2014/0033220 A1 | 1/2014 | Campbell et al. |
| 2014/0052976 A1 | 2/2014 | Marino et al. |
| 2014/0082242 A1 | 3/2014 | Murphy et al. |
| 2014/0122828 A1 | 5/2014 | Kagan et al. |
| 2014/0129784 A1 | 5/2014 | Chapman et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2014/0372656 A1 | 12/2014 | Sakurai et al. |
| 2015/0036051 A1 | 2/2015 | Broberg et al. |
| 2015/0149797 A1 | 5/2015 | Kanigicherla et al. |
| 2015/0189109 A1 | 7/2015 | Whitby-Strevens |
| 2015/0205749 A1 | 7/2015 | Whitby-Strevens et al. |
| 2015/0212806 A1 | 7/2015 | Hsieh |
| 2015/0271265 A1 | 9/2015 | Kobayashi et al. |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0191400 A1 | 6/2016 | Sreeramoju |
| 2016/0224097 A1 | 8/2016 | Hirouchi |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0026975 A1 | 1/2017 | Maric et al. |
| 2017/0108912 A1 | 4/2017 | Li et al. |
| 2017/0177222 A1 | 6/2017 | Singh et al. |
| 2017/0185545 A1 | 6/2017 | Kaushik et al. |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0325124 A1 | 11/2017 | Mitra et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

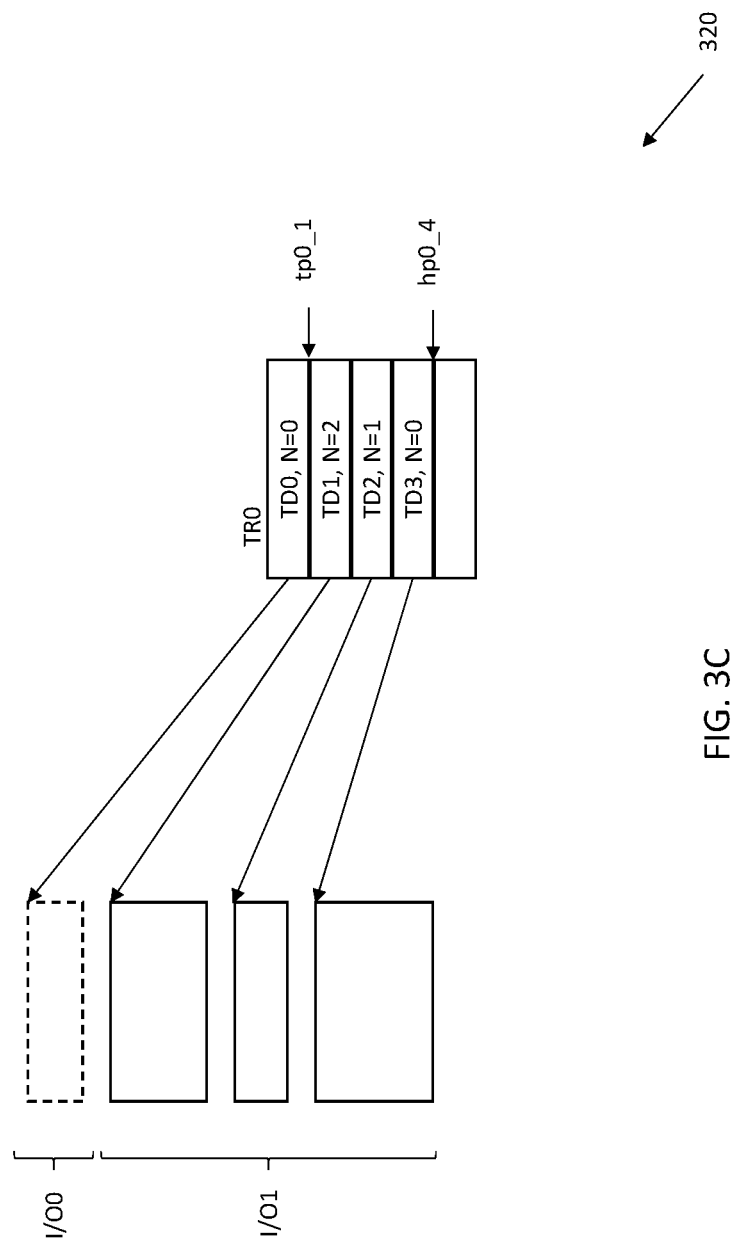

METHODS AND APPARATUS FOR REDUCED OVERHEAD DATA TRANSFER WITH A SHARED RING BUFFER

PRIORITY

This application is a continuation and claims the benefit of priority to co-owned U.S. patent application Ser. No. 15/984,153 filed May 18, 2018 and entitled "METHODS AND APPARATUS FOR REDUCED OVERHEAD DATA TRANSFER WITH A SHARED RING BUFFER", the foregoing being incorporated herein by reference in its entirety.

RELATED APPLICATIONS

This application is related to commonly owned U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; Ser. No. 14/856,283 entitled "METHODS AND APPARATUS FOR AGGREGATING PACKET TRANSFER OVER A VIRTUAL BUS INTERFACE" and filed Sep. 16, 2015; Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015; and Ser. No. 15/011,291 entitled "METHODS AND APPARATUS FOR SYNCHRONIZING UPLINK AND DOWNLINK TRANSACTIONS ON AN INTER-PROCESSOR COMMUNICATION LINK" and filed Jan. 29, 2016, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronics devices, as well as networks thereof. More particularly, the disclosure is directed to methods and apparatus for efficiently transacting data via shared memory interfaces. Various aspects of the present disclosure are directed to, in one exemplary aspect, reducing bus overhead with virtualized transfer rings.

2. DESCRIPTION OF RELATED TECHNOLOGY

Consumer devices and computer systems have grown more sophisticated over time, and has led to architectures that incorporate multiple processing components (e.g., processors). Each of these multiple processors play a distinct role in accomplishing one or more functions of e.g., a consumer device (e.g., smartphone, tablet, laptop, phablet, smartwatch, portable media players, smart home device, intelligent personal assistant). For reasons articulated in greater detail herein, the independent operation of processors is necessary to support the increasing complexity of these processing roles.

Various bus architectures and techniques have evolved over time which are able to handle increasingly faster data rates and provide higher levels of data throughput appropriate for recent implementations. One such bus architecture is based on a so-called "ring buffer." A ring or circular buffer is a data structure that stores data records into a fixed-size buffer in a single direction (e.g., top to bottom); when the buffer is full, the buffer "wraps" and any newly added data records overwrite the earliest data records, thereby mimicking a ring. Ring buffers can transfer data with very low overhead. Since the ring buffer only writes data in a single direction, adding data can be done very quickly with minimal memory manipulation (e.g., no address, shuffling, or rewriting data record overhead). Moreover, so long as the data is consumed at approximately the same rate as it is stored, the ring buffer will not "overflow" (i.e., overwrite data entries which have not yet been consumed), or "underflow" (i.e., read data entries which still contain stale data).

While ring buffers have many benefits, their fixed size constraint is a significant issue for applications of arbitrary complexity and/or where multiple transfers of different priorities are queued. In particular, resizing a ring buffer can be problematic because shifting entries in an expanding or contracting ring buffer can be computationally costly. Arbitrary data flows can be more efficiently served with "referential" transfers. Succinctly stated, reference data structures provide location information for a backing memory buffer. The reference data can be de-referenced to identify its backing memory buffer which can be of arbitrary size.

Incipient research is directed to bus technologies for multiple processor devices which hybridize existing bus technologies to efficiently service a myriad of applications. For example, the so-called inter-processor communication (IPC) link (described in greater detail herein) is based on a ring buffer of reference data structures. Existing IPC implementations combine the speed and processing simplicity of ring buffer technologies, with the arbitrary sizing capabilities of reference data structures. During operation, one processor can provide a transfer ring (TR) of transfer descriptors (TD); each TD can be independently retrieved via e.g., a direct memory access (DMA) or similar bulk memory transport technology.

Unfortunately, consumer applications have a wide variety of different considerations. While the aforementioned IPC technology was contemplated for (and best suited to) multiple high-speed bulk data transfers, some applications only transact small amounts of data. More directly, every IPC transfer includes signaling overhead (e.g., de-referencing the reference data structure) regardless of the amount of data being transferred. Consequently, applications that transfer small amounts of data suffer from a disproportionate amount of signaling overhead. For these transfers, the overhead requirements for the transfer ring may detract from the overall ring buffer efficiency.

As a further complication, not all data is equally important. Modern consumer electronics support a wide diversity of user applications, many of which have proprietary and/or fluidly changing prioritization schemes. While there are some bus technologies that support priority based delivery, such techniques typically are natively supported by the bus hardware and are uniformly applied across all data transfers. Artisans of ordinary skill in the related arts will readily appreciate that it is infeasible to design bus hardware that can accommodate any possible prioritization scheme.

To these ends, solutions for delivering data efficiently within the aforementioned IPC bus technology are needed. More generally, methods and apparatus for flexibly and efficiently conveying a variety of types of data over a shared memory interface is needed.

SUMMARY

The present disclosure satisfies the foregoing needs by providing, inter alia, methods and apparatus for efficiently transacting data via shared memory interfaces.

A method for requesting a data transfer is disclosed. In one embodiment, the method includes: determining a transfer size associated with a data payload; and when the transfer size exceeds minimum threshold: allocating a transfer data structure. In one exemplary embodiment, when the transfer size does not exceed the minimum threshold, the method includes: creating a null transfer data structure; and allocating memory for a completion transfer data structure; and providing the null transfer data structure to the processor.

In one variant, the completion transfer data structure includes a dynamically enabled or disabled footer sized for the transfer size of the data payload. In one such variant, the null transfer data structure includes multiple null elements. In some cases, the act of providing the null transfer data structure to the processor does not include allocating a backing memory buffer.

In another variant, the act of providing the null transfer data structure includes writing to a doorbell register.

In some exemplary variants, the minimum threshold is eight (8) kilobits (8 Kb). In other variants, the minimum threshold is two (2) kilobits (Kb).

In some variants, the completion transfer data structure includes a completion descriptor. In one such exemplary variant, the completion descriptor is a data record of a completion descriptor ring.

A method for servicing a data transfer is disclosed. In one embodiment, the method includes: retrieving a data structure; determining a data type of the retrieved data structure and when the retrieved data structure is a reference data structure, writing a payload to a backing memory identified by the reference data structure. In one exemplary embodiment, the method further includes writing the payload to a footer of a completion data structure when the retrieved data structure is a null data structure.

In one variant, the act of retrieving the data structure includes storing the data structure to a local cache memory that is characterized by a first access latency. In one such exemplary variant, wherein the backing memory is characterized by a second access latency greater than the first access latency.

In another variant, the reference data structure includes a transfer descriptor of a transfer descriptor ring.

In still another variant, the completion data structure includes a completion descriptor of a completion descriptor ring.

In yet another variant, the null data structure includes a virtual transfer descriptor ring.

A multi-processor apparatus is disclosed. In one embodiment, the multi-processor apparatus includes: a plurality of processors coupled to a shared non-transitory computer-readable medium; the shared non-transitory computer-readable medium including a transfer data buffer; and logic configured to determine a plurality of transfer sizes associated with a plurality of data payloads. In one exemplary embodiment, the multi-processor apparatus further includes logic configured to: for each of the plurality of data payloads: when a first data payload has a transfer size that exceeds a minimum threshold size, allocate a memory allocation within the transfer data buffer for the first data payload; and provide a transfer descriptor to a first processor of the plurality of processors that identifies the memory allocation. In one exemplary embodiment, the logic is further configured to provide a null transfer descriptor to the first processor of the plurality of processors; wherein the null transfer descriptor is configured to cause the first processor to generate a completion descriptor that includes the first data payload.

In one variant, the shared non-transitory computer-readable medium is characterized by a first access latency; the first processor of the plurality of processors is coupled to a local non-transitory computer-readable medium; and the local non-transitory computer-readable medium is characterized by a second access latency faster than the first access latency. In one such variant, the first processor of the plurality of processors further includes logic configured to write the first data payload to the memory allocation.

In another variant, the first processor of the plurality of processors further includes logic configured to transmit the completion descriptor that includes the first data payload. In another such variant, the null transfer descriptor identifies a size of the completion descriptor.

A processor configured to request a data transfer is disclosed. In one exemplary embodiment, the processor is coupled to non-transitory computer-readable medium that include one or more instructions which when executed by the processor, cause the processor to request the data transfer.

A processor configured to service a data transfer is disclosed. In one exemplary embodiment, the processor is coupled to non-transitory computer-readable medium that include one or more instructions which when executed by the processor, cause the processor to service the data transfer.

A system for enabling multiple processors to request and service data transfers is disclosed. In one exemplary embodiment, the system comprises a consumer electronics apparatus. In one such variant the consumer electronics device is selected from the group including: smartphone, tablet, laptop, phablet, smartwatch, portable media player, smart home device, intelligent personal assistant.

In another aspect of the present disclosure, a method of data transfer between a first independently operable processor apparatus and a second independently operable processor apparatus is disclosed. In one embodiment, the method includes: based at least on a transfer parameter of a data payload meeting a prescribed criterion: providing a virtualized data structure via a shared memory accessible by the first and second independently operable processor apparatus; based at least on the virtualized data structure, causing one of the first and second independently operable processor apparatus to write a completion data structure to the shared memory, the data payload being contained within at least one optional field of the completion data structure; and obtaining the data payload via retrieval of the completion data structure from the shared memory.

In another aspect of the present disclosure, a multi-processor apparatus is disclosed. In one embodiment, the multi-processor apparatus includes: a first independently operable processor; a second independently operable processor; and a shared memory apparatus; wherein the second independently operable processor is configured to: receive a plurality of downlink payloads via a baseband modem; and based on at least one transfer parameter of at least one of the plurality of downlink payloads meeting one or more prescribed criteria, transfer a data structure to the first independently operable processor via the shared memory apparatus, the data structure including at least one field containing the at least one downlink payload.

In another aspect of the present disclosure, a method of data transfer to a first independently operable processor apparatus from a second independently operable processor apparatus is disclosed. In one embodiment, the method includes: receiving a data structure via a shared memory accessible by the first and second independently operable processor apparatus; based at least on a determination that the received data structure includes a null data structure that lacks a backing memory allocation, writing a completion data structure to the shared memory, the completion data structure including a data payload within at least one field of the completion data structure; and causing the first independently operable processor to read the completion data structure and obtain the data payload thereby.

Various other methods and/or apparatus configured to optimize transactions based on memory usage are disclosed herein. In some embodiments, methods and/or apparatus configured to optimize for different memory architectures are disclosed. In one variant, the memory technologies are SRAM and DRAM, each characterized by different access latencies, costs, power consumptions, and/or other operational characteristics.

Various other methods and/or apparatus configured to provide transactions based on dynamically enabled or disabled fields are described. In some embodiments, methods and/or apparatus configured to use "optional fields" within data structures such as transfer descriptors and/or completion descriptors are described.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 3C is a logical block diagram of one exemplary scatter-gather transfer descriptor, useful for illustrating various principles described herein.

Figure 1:
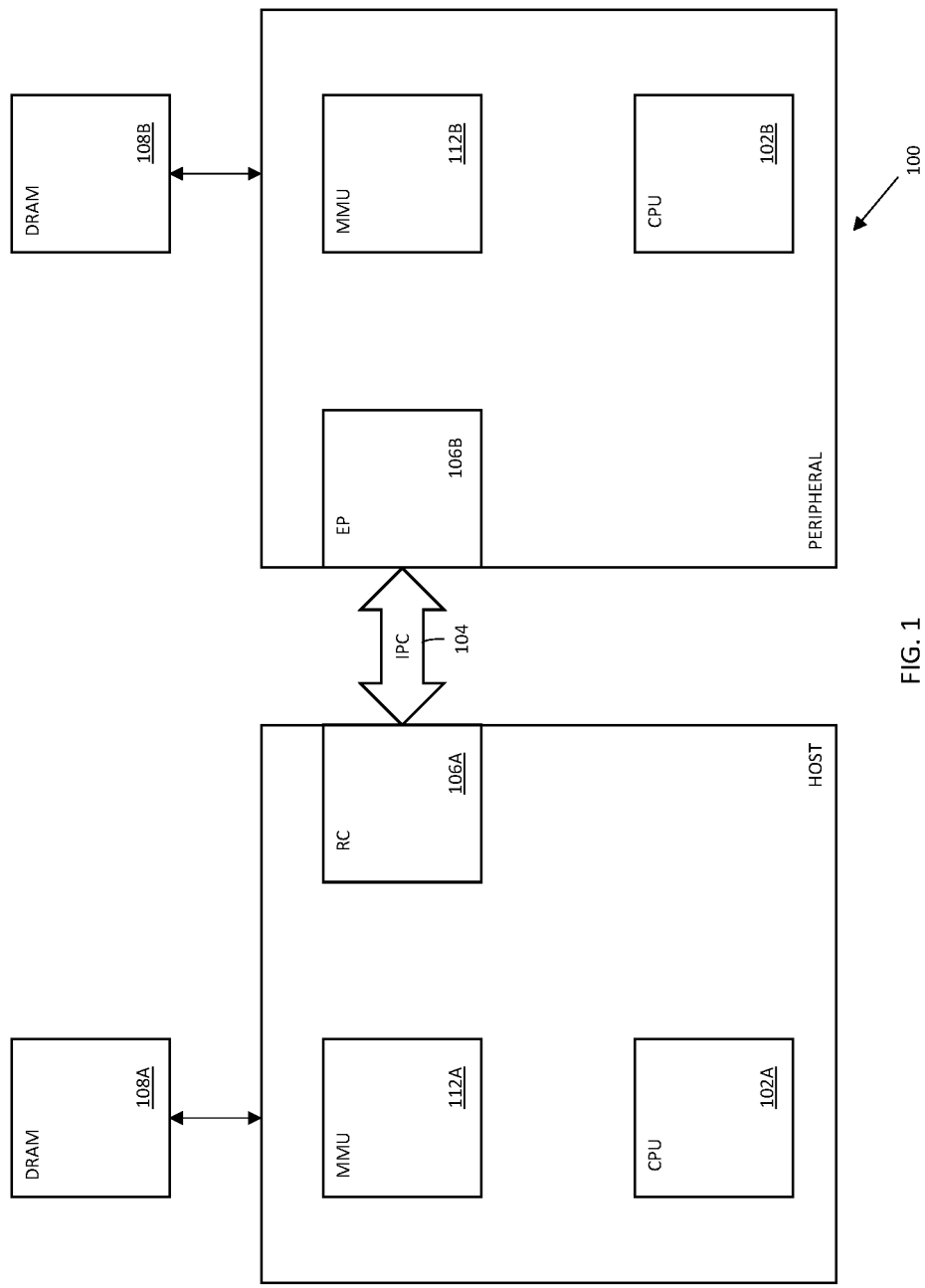
FIG. 1 is a logical block diagram of an exemplary apparatus, useful for illustrating various principles described herein.

All figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated herein by reference in its entirety), it will be recognized by those of ordinary skill that the present disclosure is not so limited. In fact, the various aspects of the disclosure are useful in any device or network of devices that is configured to transact a variety of different data types via a shared memory interface, as is disclosed herein.

Exemplary Inter-Processor Communications Link

As previously noted, bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications, for example, mobile communication devices. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors.

As used herein, the term "independent" refers to a processor in a processing system having one or more of the processor clock domain, processor power domain, processor code base, arithmetic units, registers, and/or memory, isolated to allow the processor to operate without other processors in the processing system. In one exemplary embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

As used herein, a "processor" refers generally to any logic or circuitry that responds to and processes computer-readable instructions that are stored within, for example, a non-transitory computer-readable medium, e.g., a memory.

As a brief aside, so-called "application processors" are processors that are configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

A so-called "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band networks).

In one aspect, the IPC protocol is based on a "shared" memory interface for run-time processing (i.e., the independently operable processors each share, either logically or physically, a common memory interface). In one such embodiment, the shared memory interface provides a multi-channel IPC path for high throughput transfers. In one exemplary implementation, the shared memory interface remains functional when any one of the independently operable processors is active, even when one or more of the remaining independently operable processors are asleep, powered down, powered off, etc.

As used herein, the term "logical" is used to refer to, without limitation, an abstraction (typically performed in software or machine logic) to represent physical mechanisms, attributes or functionalities as a data structure. For example, as used herein a "logical bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "data structure" refers without limitation to any particular schema for organizing and storing data such that it can be accessed and modified. A data structure is generally characterized by one or more of: (i) the collection of data elements, (ii) the relationships between the various data elements (if any), and (iii) the functions or operations that can be applied to the data. Common examples of data structures include without limitation scalars, records, vectors, arrays, multi-dimensional arrays, linked lists, hashes, union, classes, buffers, circular or ring buffers, FIFO (first in, first out) buffers, LIFO (latest in, first out), graphs, trees, and/or any other structured data.

As used herein, the term "in-band" refers without limitation to data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

FIG. 1 illustrates exemplary apparatus 100 useful for illustrating various principles described herein. As shown, the apparatus 100 includes a first and second processor (102A, 102B), and a physical bus interface 104 that is configured to implement an inter-processor communication (IPC) link between two (or more) independently operable processors.

In one exemplary embodiment, the first and second processor are connected via a tunneled bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors operate independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor (AP). As shown in FIG. 1, the first processor 102A is coupled to a Root Complex (RC) 106A which functions as the host of the IPC bus. In one implementation, the second processor 102B includes a wireless modem. In other embodiments, the second processor 102B may be e.g., a media processor, or other network processing element.

Common examples of processors include without limitation, application processors (AP), baseband processors (BB), media processors, network processors (e.g., network routers, gateways, hubs, and/or other network accelerators), hardware accelerators, graphics processors, digital signal processors (DSP), field programmable gate arrays (FPGA), application specific integrated circuits (ASIC), neural networks, artificial intelligence (AI) engines, security modules, and/or any other processing logic.

As shown in FIG. 1, the second processor 102B is coupled to an Endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power.

As used herein, the term "buffer" refers to a device, circuit, logic, or an area of a computing environment that is used to store data temporarily, typically stored thereon until instructions are given or received to move the stored data to another entity (e.g., processor, memory, another buffer). The term "buffer" may be interchangeable with similar terms such as "queue" or "memory" or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, dynamic array. Persons of ordinary skill in the relevant art will recognize various other structures and operations related to buffering and temporary data storage.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
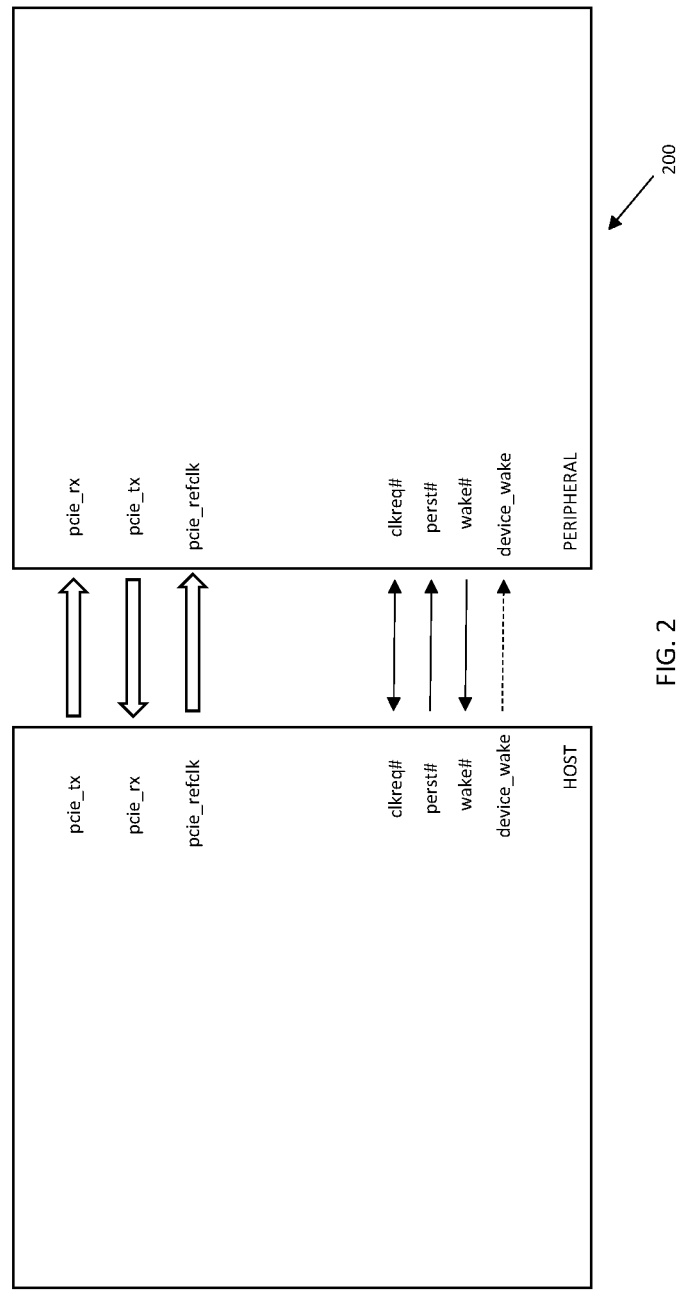
FIG. 2 is a logical block diagram of an exemplary inter-processor communications (IPC) link, useful for illustrating various principles described herein.

Referring now to FIG. 2, the physical bus interface 104 is loosely based on the Peripheral Component Interconnect Express (PCIe) standard (e.g., the aforementioned PCI Express Base Specification Revision 4.0 dated Oct. 5, 2017, previously incorporated herein by reference in its entirety). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality are described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (pci-e_rx, pci_tx). Each lane is a full-duplex byte stream, transporting data packets in eight-bit 'byte' formats, between the RC and EP of a link, in both directions simultaneously. The physical IPC link 104 can support multiple logical links representing multiple ongoing data sessions.

In one such embodiment, each logical bus interface further includes one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Bulk Data Transactions—

Figure 3A:
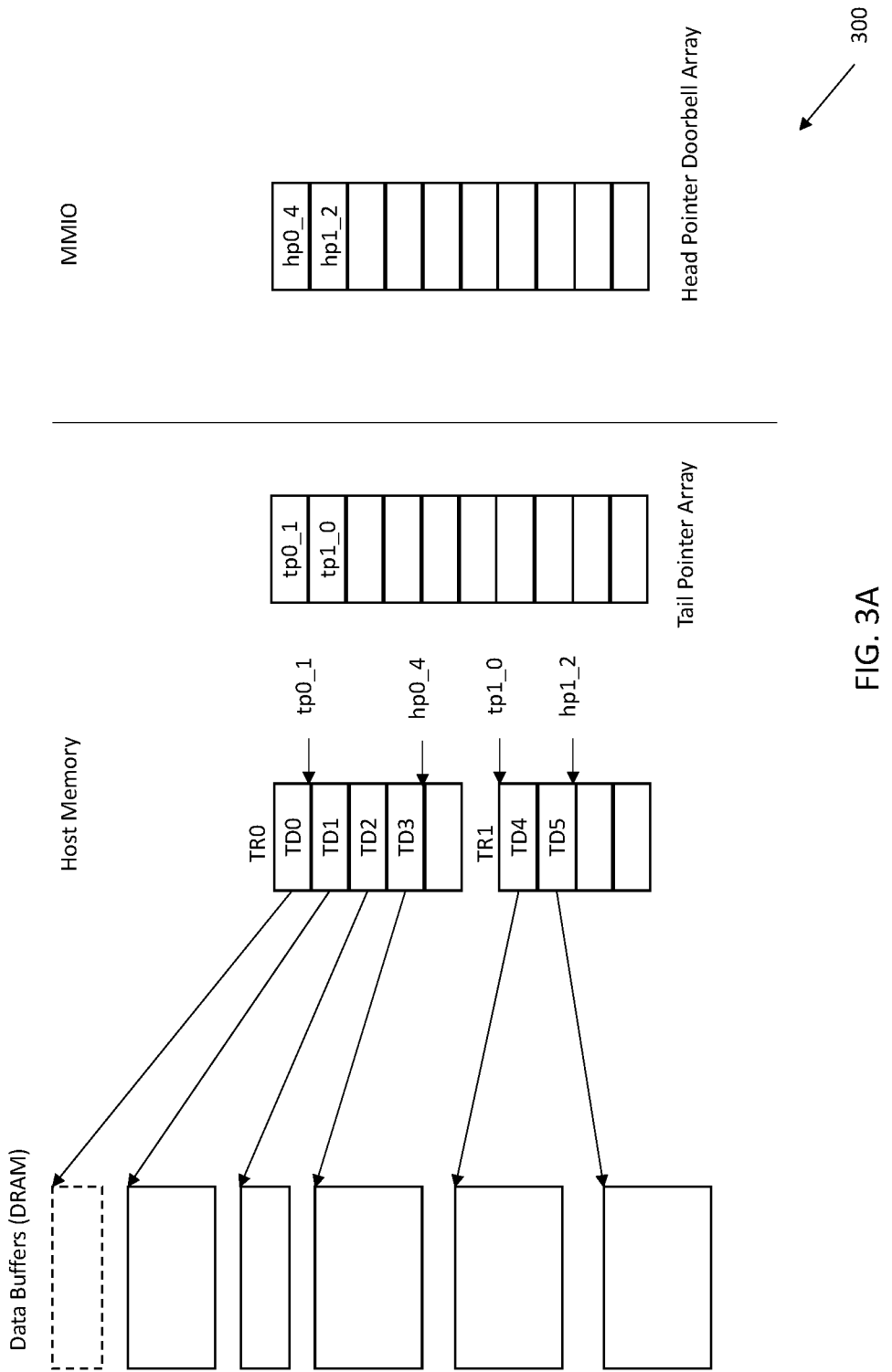
FIG. 3A is a logical block diagram of exemplary data structures used during inter-processor (IPC) link operation, useful for illustrating various principles described herein.

Referring now to FIG. 3A, data transactions (e.g., in input/output (I/O)) associated with one or more data pipes may be composed of at least one transfer descriptor (TD) that is identified within a transfer descriptor ring (TR) described infra. In one embodiment, a single TD may describe a physically contiguous memory buffer, accessible by the host/peripheral processor over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

Each "pipe" (data stream) is associated with one "transfer descriptor ring" also called "transfer ring" (TR). During normal bulk transaction mode operation, TDs sit inside a TR data structure that resides in host processor memory and is accessible by the peripheral processor. Each TR is described by a TR head index (also referred to as a head pointer) and/or a TR tail index (also referred to as a tail pointer), and encompasses one or more TDs. The head pointer points to the next empty slot in the TR for the host processor, whereas the tail pointer points to the address of next TD which the peripheral processor will process. The head pointer is written by the host and read by the peripheral. The tail pointer is read by the host and written by the peripheral. When the head pointer is equal to the tail pointer, the TR is empty.

As a brief aside, within the computer programming arts, there are a wide variety of "data types". As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, specialized and/or specifically designed for a particular function or operation.

So-called "value" data types are data types that can be directly manipulated "in-line". In some cases, in-place execution can be leveraged by the processing logic to e.g., optimize execution times. Common examples of value data types include, without limitation: Booleans, characters, integer numbers, floating-point numbers, and fixed-point numbers. Another family of commonly used data types are so-called "reference" data types; reference data types are interpreted by processing logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (i.e., a compiler copies the list data structure at each instance of the list), or treated as a reference (i.e., the complier references the same memory location for each instance of the list).

As used herein, the term "pointer" refers to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

Referring back to FIG. 3A, the TD/TR data structure enables independent queue processing for both the host and peripheral. For example, the peripheral can read from one area of memory described by a first TD while the other host writes to a different area of memory to prepare a different TD. Processing may be performed on a e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure.

The exemplary data structures 300 include a first pipe (TR0) in the uplink direction (from the host to the peripheral), and a second pipe (TR1) in the downlink direction (from the peripheral to the host). As shown, the host processor has queued four (4) TDs in TR0 for uplink transfer and informed the peripheral processor by writing the address (hp0_4) at the TR0 head pointer offset in the head pointer doorbell array (HPDA) slot 0. After the peripheral processor has successfully transmitted the data for TD0, it updates the tail pointer array (TPA) entry (slot 0) by writing a new tail pointer address (tp0_1). When the peripheral processor updates the appropriate TPA entry, the host can free the corresponding data buffer from memory. Similarly, as shown, the host has queued two (2) TDs in TR1 for downlink transfer and informs the peripheral process device by writing hp1_2 at offset 1 in HPDA. Once the peripheral processor has written to these TDs, it will update TPA to inform the host.

Figure 3B:
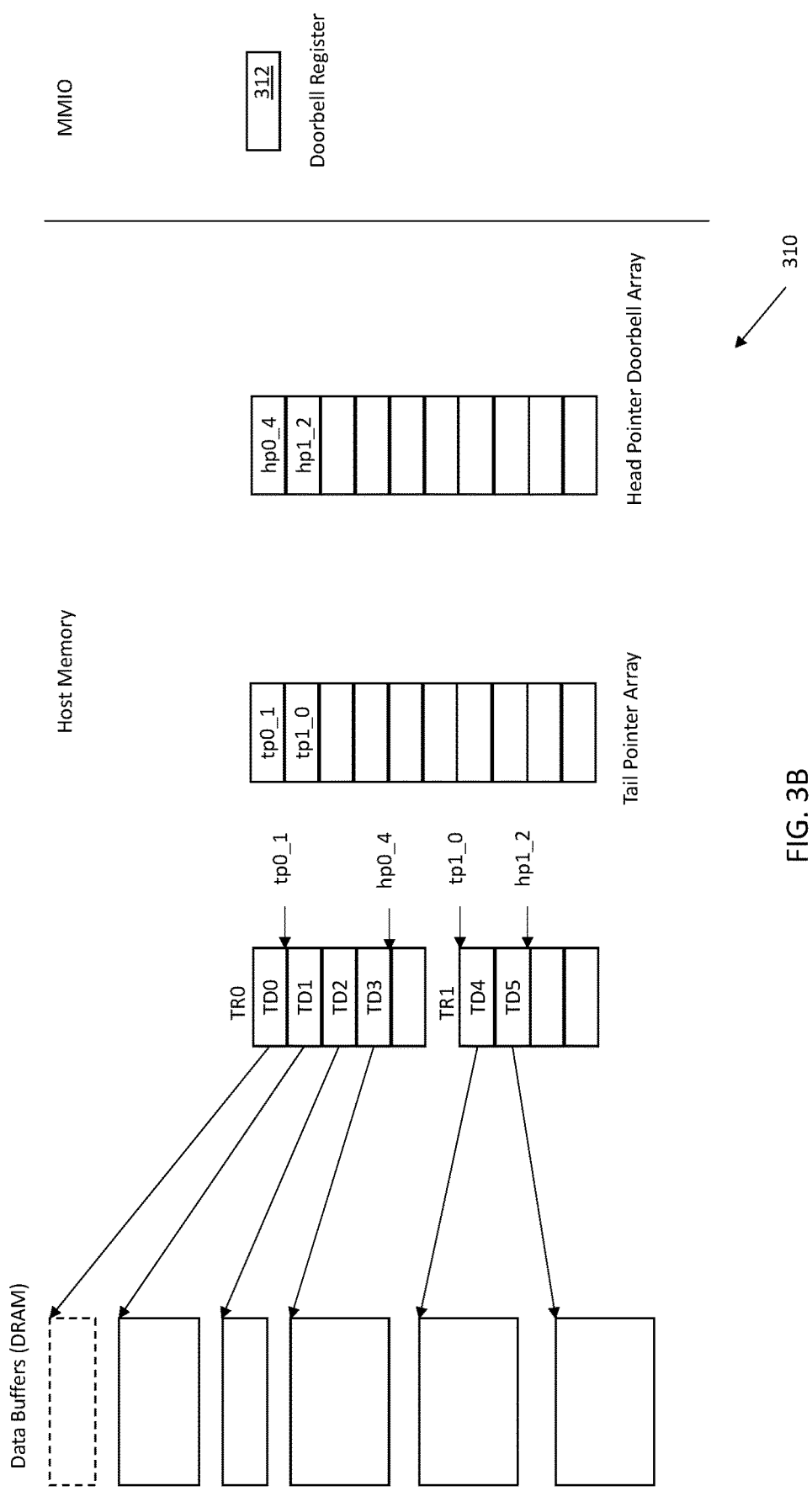
FIG. 3B is a logical block diagram of alternate exemplary data structures with a "doorbell register", used during inter-processor communications (IPC) link operation, useful for illustrating various principles described herein.

FIG. 3B illustrates an alternate exemplary data structure 310, with a "doorbell register" 312 disposed in the MMIO, and the doorbell array disposed in the host processor (e.g., AP). As shown therein, the TPA and HPDA arrays are located in host memory. The peripheral accesses the TPA and HPDA responsive to a doorbell register signal ("ringing the doorbell"). Functionally, the exemplary data structure 310 of FIG. 3B is handled identically to the exemplary data structure 300 of FIG. 3A.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

FIG. 3C illustrates one exemplary scatter-gather TD 320 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1), and TD3 points to TD0 which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TRs, the size field is read-only for the peripheral, whereas for downlink TRs the size field may be read/write for the peripheral. During a downlink transfer, the peripheral reads the size field to determine the maximum size of the buffer available. After the downlink transfer, the peripheral may update the size field with the actual size of data written into the buffer.

Figure 3D:
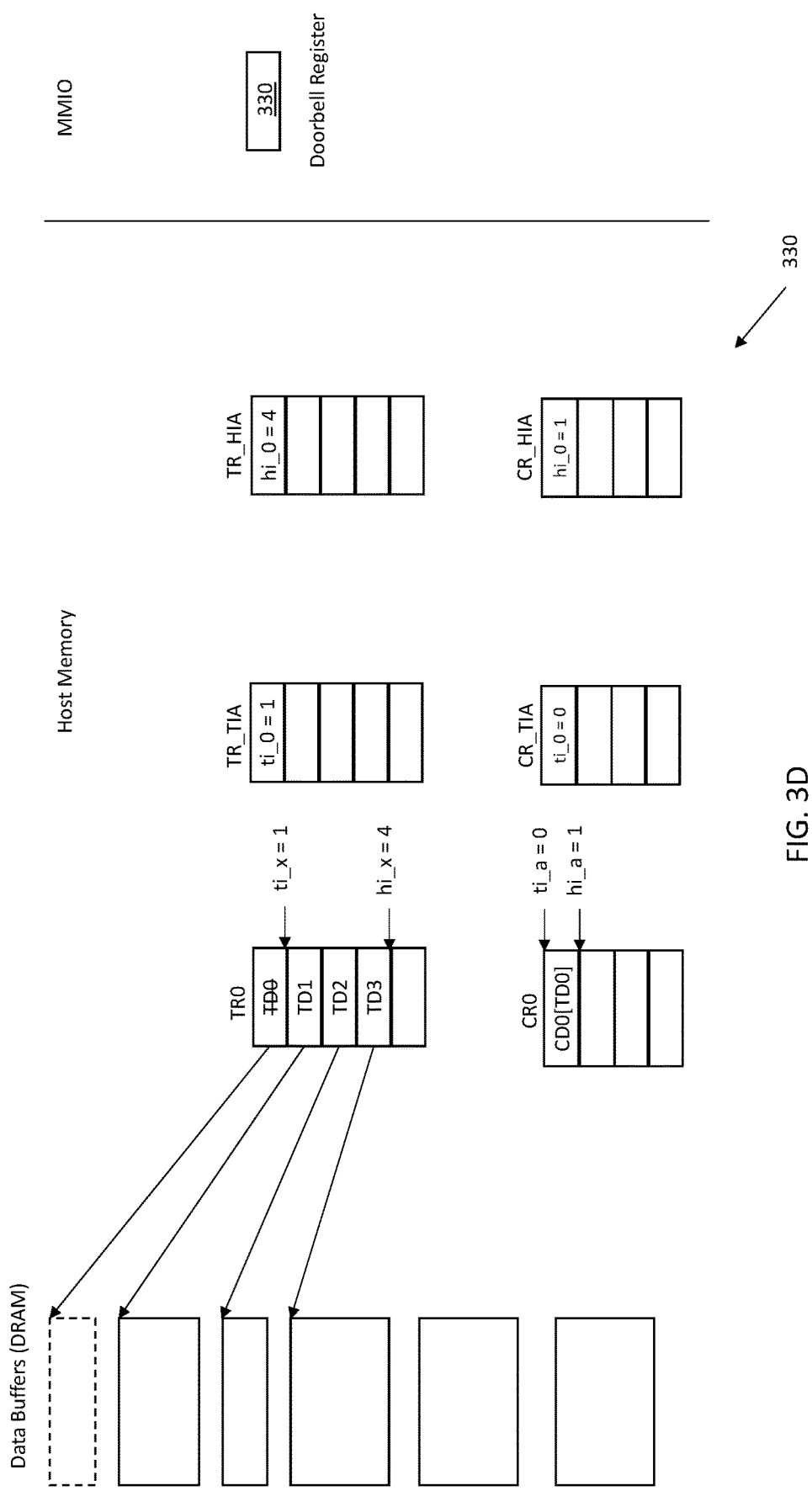
FIG. 3D is a logical block diagram of exemplary data structures used for a completion based variant of inter-processor (IPC) link operation, useful for illustrating various principles described herein.

FIG. 3D illustrates one exemplary completion variant 330 which is shown with a set of TDs/TR and corresponding completion descriptors (CDs) stored within a completion descriptor ring (CR). Completion mechanisms enable multiple processors to coordinate by explicitly acknowledging when data has been e.g., transmitted, rendered, consumed, and/or otherwise processed. Such information can be used to support low-latency transactions, reduce and/or substantially eliminate waiting or confirmation times, and/or improve the speed of operation between independently operable processors.

As shown in FIG. 3D, a first processor (e.g., a host processor) writes data into TDs/TRs in a shared memory apparatus in a manner similar to that described above with respect to FIGS. 3A-3C. Additionally, the second processor (e.g., a peripheral processor) can write completion status information for each transfer descriptor (TD) into a corresponding completion descriptor (CD) which is organized according to a "completion descriptor ring" or "completion ring" (CR). Both the CR and TR are tracked with head and tail indices which identify outstanding data and completion pipes.

The peripheral processor reads the TDs from the TR, and retrieves the data contained therein or referred by. For example, the peripheral processor reads each TDs and/or dereferences the TDs to the corresponding data or payloads that are pointed to by the TDs. However, unlike the data transaction schemes of FIG. 3A-3C, the peripheral processor processes the TD according to its own internal considerations, determines completion status, and writes the status to the CDs/CR independently, thereby providing explicit completion status information to the host processor.

The CDs contain completion information that indicate to the host processor (i.e., the processor that originated the TDs) that the data has been processed by the peripheral processor and that the memory allocation for the TD/TR can be freed. For example, as shown, the CD0 indicates that TD0 has completed. As a result, the memory allocation for TD0 can be freed and reclaimed for subsequent data transactions.

Exemplary Small Data Transactions—

The foregoing discussions of FIG. 3A-3D illustrate exemplary data structures 300 for bulk data transfers. As previously noted, the aforementioned IPC technology is best suited to multiple high-speed bulk data transfers. Some applications only transact small amounts of data. Unfortunately, every IPC transfer includes signaling overhead (e.g., the reference data structure) regardless of the amount of data being transferred, thus applications that transfer small amounts of data suffer from a disproportionate amount of signaling overhead. For these transfers, the overhead requirements for the transfer ring may detract from the overall bus efficiency.

As a brief aside, bus efficiency is commonly represented as a percentage of the theoretical maximum memory transfer bandwidth achieved by a particular memory interface implementation; e.g., bits per access. Within the aforementioned bulk data transfer, every data transfer first provides over a TD. The TD is de-referenced in order to identify the corresponding area in DRAM where the data is stored. The steps of receiving the TD and de-referencing the TD negligibly affect the bus efficiency for large amounts of data; however, retrieving a small amount of data with the same technique has a comparatively high overhead and access latency.

For example, an exemplary transfer descriptor (TD) describes a physically contiguous buffer in host memory having a maximum size of four (4) Megabytes (MB). Each TD contains the following fields: type of the buffer (8 bits), size of the buffer (24 bits), address of the buffer (64 bits), identifying tag information (16 bits), a remaining number of TDs in the transfer (8 bits), and reserved or status bits (8 bits). Under such an implementation, bulk data transfers have a steady state bus efficiency of ~4 MB per access (assuming that every TD is maximally packed); for comparison, a single transfer of a sparsely packed TD containing only 128 bits would have $\frac{1}{256}$K the bus efficiency (e.g., 128b per access is $\frac{1}{256}$K of 4 MB per access).

As used herein, the term "payload" refers to data that is intended for delivery to, and/or consumption by an application endpoint. The payload is distinguished from other "overhead" data which may include headers, trailers, control information, error checking and/or error correction information, noise rejection information, and other formatting or transmission based data. Overhead data is added to the payload to facilitate delivery to the application endpoint, however the overhead data itself is not usually provided to the application endpoint.

Unfortunately, within the context of the IPC bus technology, a small data transfer inherently cannot defray the cost of overhead (de-referencing and access latency) over its payload data. To these ends, various aspects of the present disclosure are directed to reducing bus overhead. Consequently, various embodiments of the IPC bus implement a so-called "Augmented TR" (ATR) that does not require de-referencing, instead the ATR includes the payload directly (in-line) within the TDs.

As used herein, the term "augmented" is used to refer to, without limitation, a data structure that is accessed according to recognized formatting and/or schema, to access one or more additional physical mechanisms, attributes or functionalities included within the data structure. For example, an "augmented" transfer descriptor (ATR) is accessed with similar protocols to a transfer ring (TR) (e.g., reading, writing, opening, closing, etc.). However, the ATR is modified to reference data structures encapsulated therein rather than backing memory buffers. In some cases, the augmentations may be transparent to the accessing entity (e.g., the processor accesses an ATR identically to a TR). In other cases, augmentations may be leveraged by the accessing entity (e.g., the processor may recognize ATR and leverage the in-line data format to optimize task scheduling, etc.)

Figure 4A:
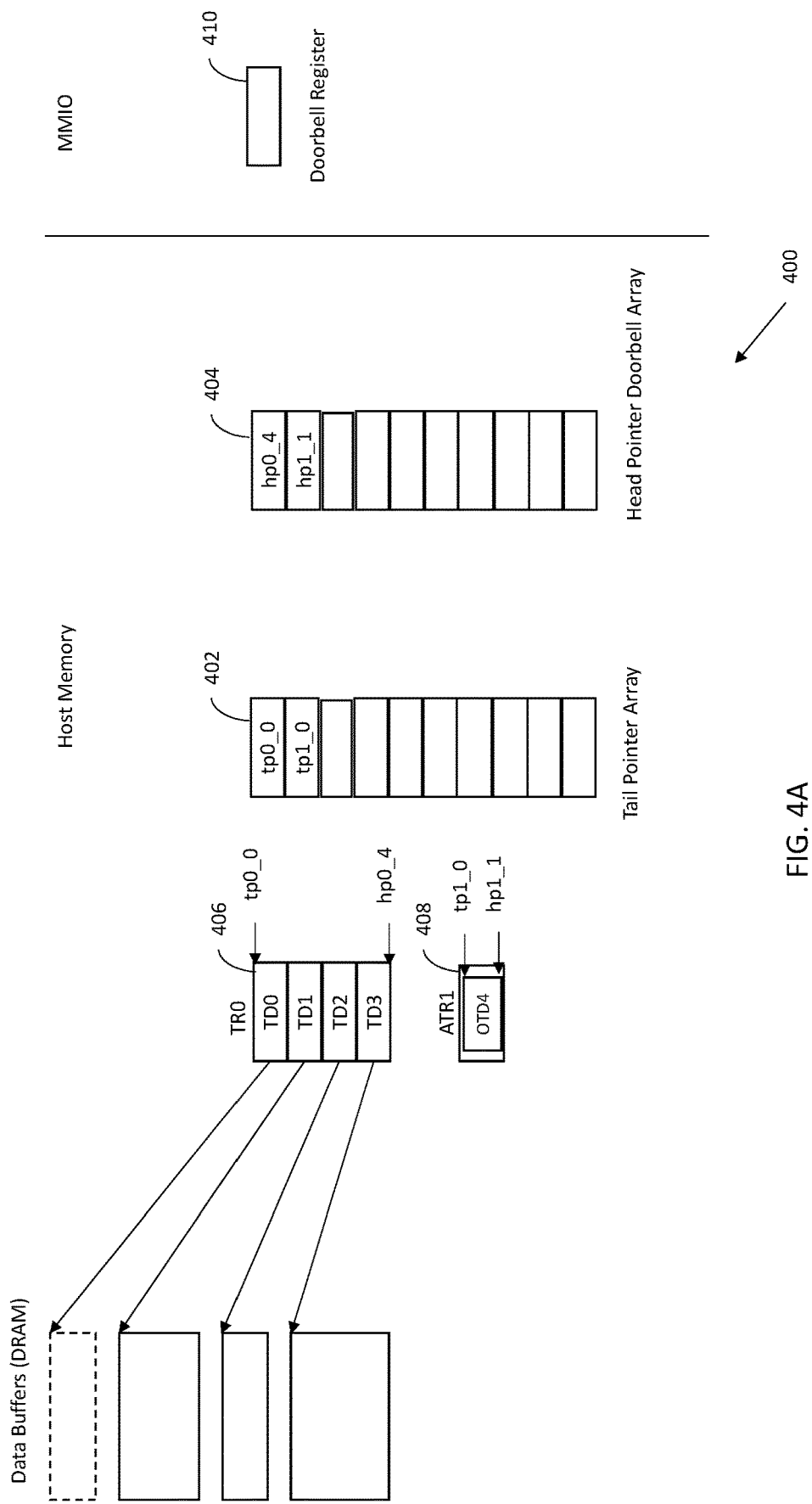
FIG. 4A is a logical block diagram of one exemplary augmented transfer descriptor ring (ATR), in accordance with the various principles described herein.

Referring now to FIG. 4A, one exemplary embodiment of an Augmented Transfer Descriptor Ring (ATR) is presented. Two transfer rings are shown: a transfer ring (TR0 406) and an augmented transfer ring (ATR1 408). TR0 operates in the manner described above (see e.g., discussions of FIG. 3A-3D, supra). In contrast, ATR1 includes its payloads directly (in-line) within an "optional header/footer" transfer descriptor (OTD), consequently ATR1 does not require de-referencing in order to extract the payload.

Moreover, as is also illustrated within FIG. 4A, the other operational aspects of ATR1 operation remain substantially identical to TR0 operation. For example, ATR1 408 uses the same head and tail pointer array (402, 404) as TR0 406. Similarly, the ATR works with the same semantics as a TR0 (e.g., TR0 is accessed via pointers hp0_4 and tp0_0; ATR1 408 is accessed via pointers hp1_1 and tp1_0). While the illustrated embodiment of FIG. 4A utilizes a "doorbell register" 410 disposed in the MMIO and the doorbell array disposed in the host processor (e.g., AP), artisans of ordinary skill in the related arts given the contents of the present disclosure will readily appreciate that other configurations may be substituted with equivalent success. For example, the doorbell register 410 may be replaced with the doorbell array, and located within the MMIO instead (similar to the configuration set forth within FIG. 3A).

As a brief aside, both TRs and ATRs can be created by "opening" a pipe, and destroyed by "closing" the pipe. Common examples of parameters that can be used to open a data pipe, include without limitation e.g., type of pipe, address, number of entries, identification, index vector, header size, footer size, doorbell vector, priority, traffic class, interrupt vector, and or any number of other data structure specific information. For example, a TR opening message may include: a buffer size ring address, a buffer size ring entry width, a buffer size ring entry chain, and/or ID, etc. In one exemplary embodiment, TRs and ATRs use the same opening message but either enable or do not enable an optional header or footer for ATR operation based on a flag or other indicia. In one such variant, the ATR stores one or more OTDs within an optional header/footer. In other variants, the ATR stores one or more OTDs within an adjacent data structure or other similarly accessible memory buffer.

As used herein, the term "optional" refers to a function or feature that may be dynamically enabled or disabled, in whole or in part, prior to or during operation. More directly, artisans of ordinary skill in the related arts will readily appreciate given the context of the present disclosure, that logic to support an "optional" feature or function is necessarily present within embodiments that explicitly support an optional feature or function, regardless of whether the optional feature or function is enabled for operation. More directly, optionality is only with reference to whether the feature is active during operation, not whether the feature is supported within such embodiments.

Figure 4B:
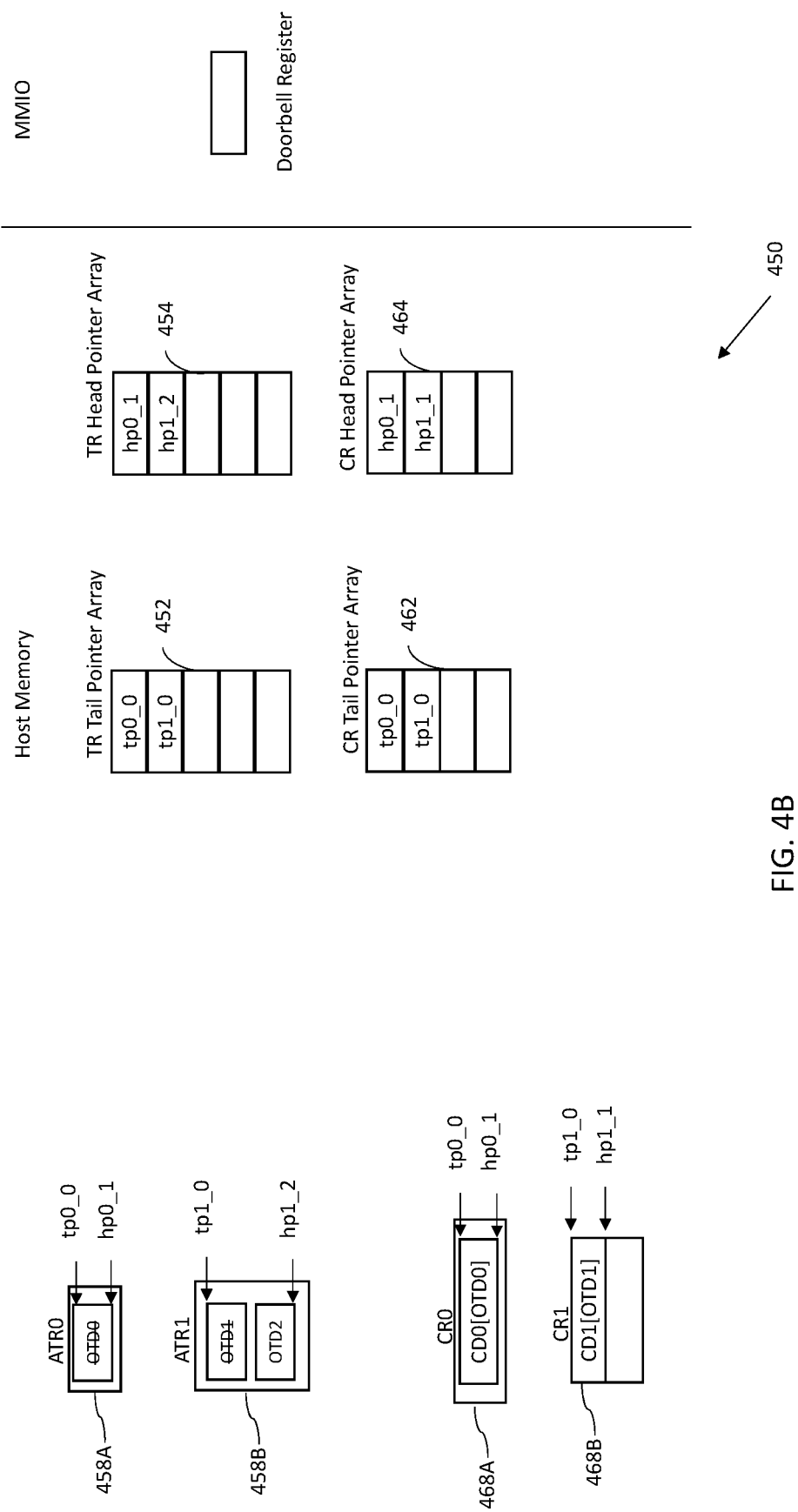
FIG. 4B is a logical block diagram of exemplary data structures used for a completion based variant of the virtualized transfer descriptor ring (ATR), in accordance with the various principles described herein.

Referring now to FIG. 4B, one exemplary completion variant 450 for small data transaction is shown. A TR tail pointer array 452 and a TR head pointer array 454 include pointers to small data transaction rings ATR0 458A and ATR1 458B. As with normal TRs, an ATR may reference multiple OTDs. For example, as shown in FIG. 4B, ATR1 includes OTD1 and OTD2

Additionally, while the present disclosure is primarily directed to transfer descriptor operation, the techniques described herein may be applied with equivalent success to completion rings. For example, as shown in FIG. 4B, a CR tail pointer array 462 and a CR head pointer array 464 include pointers to small data completion rings CR0 468A and CR1 468B.

During operation, the peripheral processor reads the OTDs from the ATRs, and retrieves the data contained therein. The peripheral processor processes the OTDs, generates completion status, and writes the status to the CDs/CR, thereby providing explicit completion status information to the host processor. As previously noted, completion information can be used to support low-latency transactions, reduce and/or substantially eliminate waiting or confirmation times, and/or improve the speed of operation between independently operable processors.

In one exemplary implementation, intelligent memory recollection for augmented data structures is handled slightly differently. Unlike TDs/TR memory allocation schemes where each TD can be separately freed and reclaimed, the ATR contains all of the OTDs and every OTD must be completed before the ATR can be freed and reclaimed. For example, ATR0 458A can be freed and reclaimed because all of its OTDs (i.e., OTD0) have completed. In contrast, ATR1 458B cannot be freed and reclaimed because only OTD1 has completed, thus ATD1 must remain outstanding.

In one exemplary implementation, the exemplary ATR includes the OTDs within an optional header or footer data structure. In one such variant, the optional header or footer can be instantiated with different sizes, by increments of 4 bytes (B); the size of the optional header or footer is described by 8 bits; yielding a maximum size of $2^8 \times 4B = 1$ KB (i.e., 8 Kb). Artisans of ordinary skill in the related arts given the contents of the present disclosure will readily appreciate that the aforementioned sizes are purely illustrative; other sizes may be substituted with equivalent success.

Figure 5:
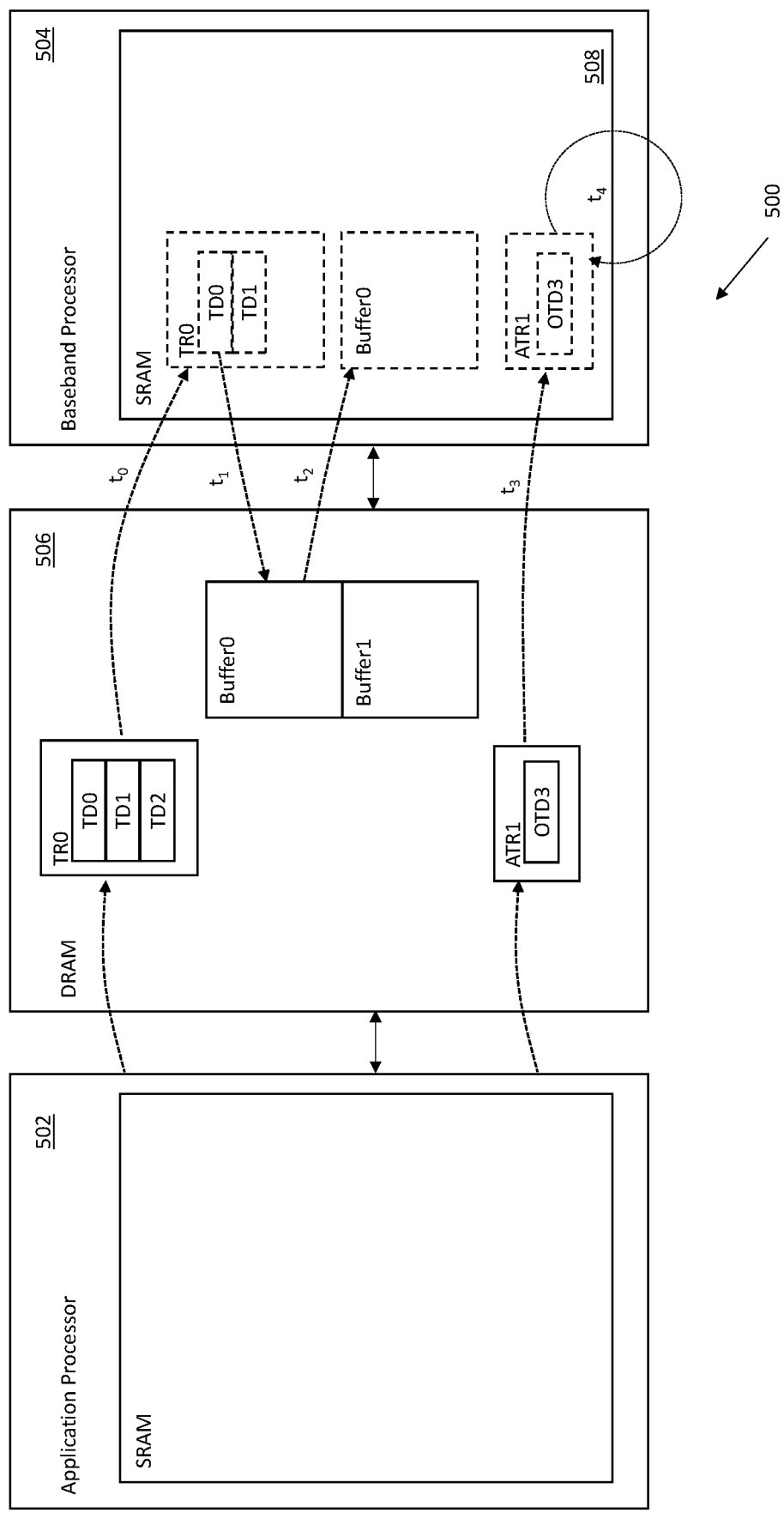
FIG. 5 is a logical representation of one exemplary apparatus performing data transfers via the exemplary data structures of FIGS. 4A and 4B, in accordance with the various principles described herein.

FIG. 5 is a logical representation of one exemplary apparatus 500 performing memory accesses for exemplary data structures, during small data and bulk data transactions. In one exemplary embodiment, the apparatus 500 includes at least two (2) distinct memory components are characterized by different capabilities (and different functionality). In one exemplary embodiment, the memory structures include at least a low access latency memory that is local to the processor apparatus and used to cache data used by the processor for program execution. A second high throughput memory is used for longer storage and/or buffering data for transfer. In one exemplary embodiment, the low access latency memory includes a Synchronous RAM (SRAM) 504 located on the baseband processor 508 and the high throughput memory includes a Dynamic RAM (DRAM) 506 that is externally coupled to both processors via a direct memory access (DMA) type mechanism.

As a brief aside, different types of memory have different operational characteristics in terms of e.g., power consumption, cost, capacity, performance, etc. Consequently, many devices implement multi-tiered memory architectures that are composed of different types of memories so as to improve overall performance. For example, Synchronous RAM (SRAM) is commonly used for cache memory operation due to its low access latency; however, SRAM is commensurately more expensive per bit stored, and consumes significant amounts of power. In comparison, Dynamic RAM (DRAM) can store more memory at cheaper cost than SRAM with higher access latency. DRAM suffers from other issues e.g., DRAM requires significant maintenance (e.g., DRAM must be refreshed, or the stored data will decay and be lost). Flash memory allows for long-term non-volatile storage (e.g., over a period of years), but has very large access latencies compared to SRAM and DRAM. Additionally, Flash cells wear out after only a few hundred thousand refresh cycles (which is far too few for most active processing applications).

Memory performance (measured in amount of data per unit time) is a combination of both access latency (the time to issue a memory access) and throughput (the amount of data in an access). For example, SRAM is high performance due to its very low access latencies. In contrast, DRAM has longer access latencies than SRAM, but provides significantly higher throughput. Artisans of ordinary skill in the related arts, given the contents of the present disclosure, will readily appreciate that different system components may be more or less tolerant of access latency and/or throughput. Thus, one common memory architecture leverages the access latencies of SRAM for a local cache memory that is closely coupled to a processor for maximal performance. The SRAM cache memory is backed with DRAM for bulk storage, that can buffer and retrieve large chunks of data when needed with a minor time penalty. Software can be stored in Flash while the device is powered off, however the software is moved to SRAM and/or DRAM when the device is first powered on (execution from Flash is impractical).

Consider a bulk data transaction within the context of the exemplary apparatus 500 of FIG. 5. As shown in FIG. 5, the application processor apparatus 502 stores TR0 into DRAM 506 which includes corresponding backing memory buffers (Buffer0, Buffer1). In this example, the baseband processor apparatus 504 reads TR0 to identify and de-reference pointers to the relevant buffer data identified by e.g., TD0 at time Subsequently thereafter, the relevant buffer data (Buffer0) is retrieved at time $t_2$. The foregoing process could be repeated to retrieve the contents of the remaining buffer, if necessary (e.g., Buffer1). As previously noted, each access by the baseband processor 504 to DRAM (e.g., $t_0$, $t_1$, $t_2$) is performed at a minor access latency penalty.

In some variants, the TD may include metadata that further allows the baseband processor 504 to determine the nature of the data described by the TD without actually retrieving the data within the memory buffer. Such capability may be particularly useful where the processor is searching for only a subset of data within a larger memory buffer. For example, a media stream that includes both video and audio may have timestamp information stored within the TD headers. By searching quickly through the metadata portions of the TD headers within the TR, the baseband processor can quickly jump to a timestamp of interest. Also, metadata may allow a processor to forward data to another processing device without examining the contents itself; for example, a processor may be able to configure another component (e.g., a graphics processor, a network interface, etc.) to directly DMA the data from the memory buffer.

Referring now to small data transactions, at time $t_3$, the baseband processor apparatus 504 reads and stores ATR1 entirely within the local SRAM cache memory 508. Then subsequently thereafter, the baseband processor can immediately process the OTD3 directly from the cached ATR1 at time $t_4$. Artisans of ordinary skill in the related arts will readily appreciate that the only DRAM access penalty occurs at $t_3$; the subsequent SRAM access at $t_4$ is read directly from the cached version of OTD3 and is not associated with any access penalty.

As shown, ATR1 does not require any backing memory for the ring. In one exemplary embodiment, the OTD of ATR1 (which are in SRAM) do not reference an external DRAM, rather the OTD store the payload within their own optional headers/footer (that are locally present in the same SRAM). In this manner, not only does ATR1 operation improve operation by obviating the access latency attributed to de-referencing, ATR1 also provides faster performance by virtue of much lower access latency of SRAM when compared to DRAM.

More generally, while the bulk data transactions can provide access to a virtually unlimited range and/or size of memory, small data transactions can provide fast access within certain bounded constraints. In particular, the reduced access time for the exemplary augmented data structure is not a function of the data size itself, but is based on the difference in underlying memory capabilities and access times. This distinction can be leveraged to further optimize operation.

As previously alluded to, the exemplary ATR can support a maximum size of $2^8 \times 4B = 1$ KB (i.e., 8 Kb). By comparison, the maximum size of an exemplary TD is 4 MB. However, there are some circumstances where a bulk TD may be used to transport small amounts of data. For example, in some cases the data may be unpredictably sized and/or too difficult to ascertain data sizes for memory allocations. Under such circumstances, a full TD may be allocated even though it might otherwise be possible to use a small data transaction.

Consider, two (2) 2 Kb transactions that could either be handled as a small or a bulk transaction. Under a bulk transaction scheme, the 4 Kb would be stored within two backing memories. In order to retrieve the entire 4 Kb allocation, the buffer would need to be retrieved separately; in other words, the total access time is $t_0+t_1+t_2$ (for the first 2 Kb buffer) plus $t_0+t_1+t_2$ (for the second 2 Kb buffer). In contrast, the same 4 Kb memory treated as a small data transaction only suffers a single DRAM access $t_3$ (the entire 4 Kb is retrieved to SRAM in a single footer, and can be directly accessed thereafter). Thus, the access latency improvements for small data transactions could disproportionately improve over bulk data transactions (i.e., the reduction in access latency is not merely a function of the reduced access size).

In the foregoing scenario, access sizes up to 8 Kb could be handed either with bulk data transfers of a TR or with small data transactions of an ATR. As previously noted, local SRAM cache memory is substantially smaller, higher performance, and more expensive compared to DRAM bulk storage. In one exemplary embodiment, infrequent and/or low priority data transactions may be better suited to and preferentially opened with bulk transaction pipes (e.g., a TR) even though the total memory buffer size may be less than 8 Kb. Similarly, frequent and/or high priority data transactions may be better suited to and preferentially opened with small data transaction pipes (e.g., an ATR) even though the total memory buffer size may exceed 2 Kb.

Additionally, in determining whether or not to open a bulk or small data transport, the application processor may consider the holistic "opportunity cost" to the SRAM cache 508. As a brief aside, cached data is a concurrently existing copy of data from its backing memory. More directly, a cache stores a copy of data to service requests for the data quickly. A cache "hit" occurs when the requested data can be found in a cache, while a cache "miss" occurs when there is no valid copy in the cache. Since cache memory is in very limited supply, more SRAM memory that is allocated to ATRs results in a smaller amount of cache memory for unrelated use; this can potentially result in higher rates of cache misses and/or lower cache efficiency.

In a related aspect, processing architectures optimize their cache performance by ensuring that the cache stores the data that is most likely to be accessed again (which can be based on a variety of different caching algorithms); less likely data is pruned. Within this context, improper ATR allocations could be pruned by cache management. In other words, the cache will overwrite the copy of the ATR in favor of other more highly accessed data. From an access latency standpoint, storing an ATR in the local SRAM cache that is pruned will require a redundant fetch; redundant fetching could potentially result in worse performance than access via the bulk data transaction schema. As a result, memory allocation logic may intelligently select either TRs or ATRs so as to optimize overall cache efficiency (e.g., allocating ATRs where the benefits outweigh costs, and vice versa).

While a particular data structure is presented herein, artisans of ordinary skill in the related arts will readily appreciate, given the contents of the present disclosure, that a different memory architecture may be substituted with equivalent success. For example, in some alternatives, the memory may be implemented on the peripheral chip (rather than the host). In still other alternatives, the memory architecture may be separate from both the host and the peripheral. While the illustrated embodiment uses different types of memory for each of the data structures; e.g., SRAM and DRAM, other variants may use the same memory (e.g., entirely within SRAM or DRAM). Still other types of memory may be substituted, based on other system considerations (e.g., cost, power consumption, performance, etc.)

Figure 6:
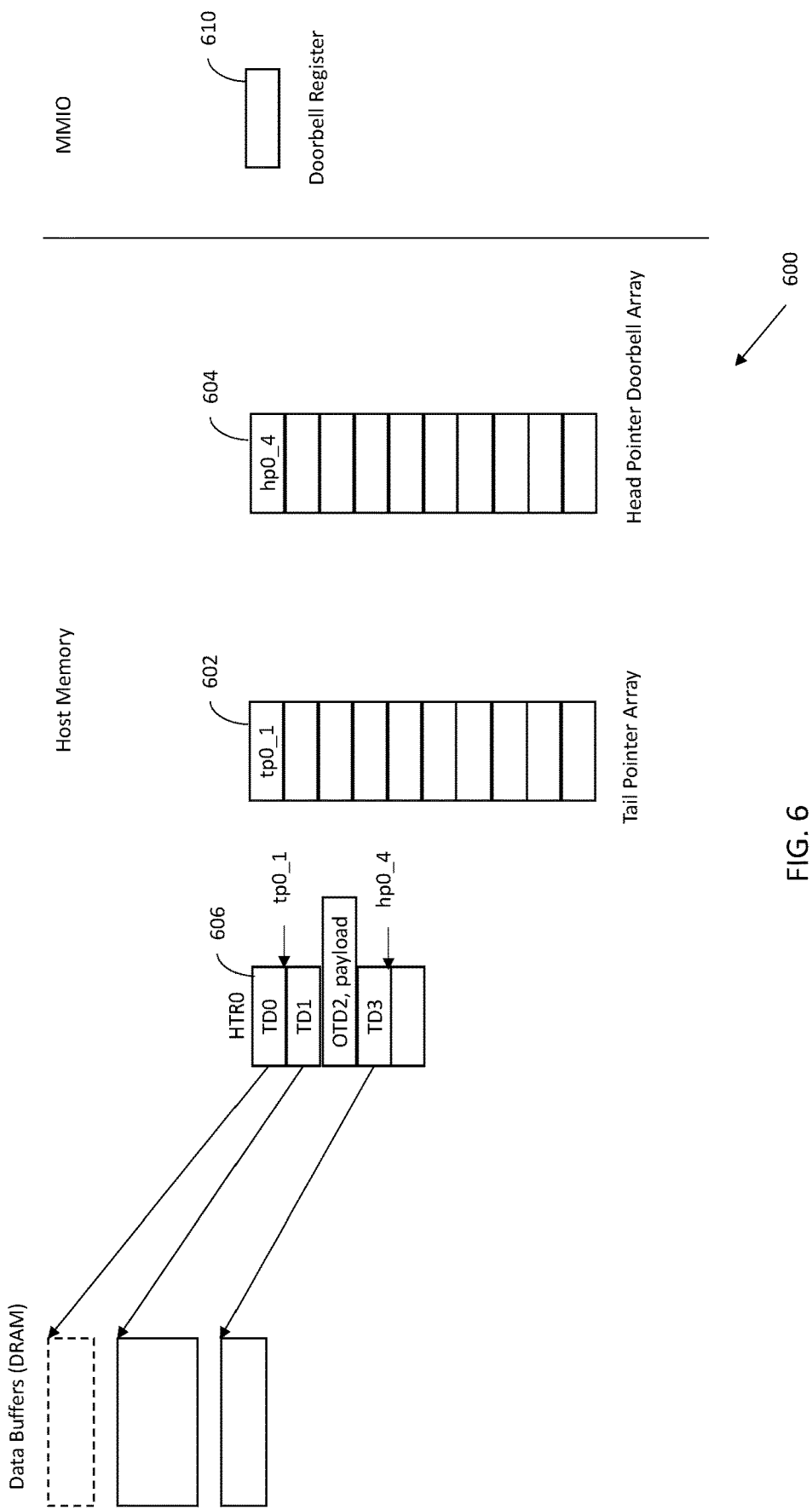
FIG. 6 is a logical block diagram of one exemplary hybridized transfer descriptor ring (HTR), in accordance with the various principles described herein.

FIG. 6 illustrates one exemplary variant of a hybridized transfer descriptor ring (HTR). As shown in FIG. 6, one hybrid transfer ring (HTR0) 606 is shown which can dynamically accommodate both reference data type transfer descriptors (TD) as well as value data type optional header/footer transfer descriptors (OTD). As shown, the host memory can flexibly allocate data buffers to back larger memory transfers (e.g., TD0, TD1, TD3) while also directly transferring data payloads without a backing memory via OTDs (e.g., OTD2) within the same overarching ring structure.

As illustrated within FIG. 6, the operational aspects of HTR0 operation remain substantially identical to TR operation. In one such implementation, HTR0 606 uses a head and tail pointer array (602, 604). Similarly, the HTR works with the same semantics as a TR. While the illustrated embodiment of FIG. 6 utilizes a "doorbell register" 610, artisans of ordinary skill in the related arts given the contents of the present disclosure will readily appreciate that other configurations may be substituted with equivalent success.

As previously alluded to, in one exemplary embodiment, HTRs can be opened with the same opening message used for TRs and ATRs. Since opening an HTR could include both TDs and OTDs, memory is conservatively allocated for the larger of the two (e.g., 8 Kb for a 2 Kb/8 Kb implementation). Alternatively, in some implementations, the TDs and OTDs of an HTR are kept the same size (e.g., 2 Kb). In one such variant, each OTD would include a flag (or other indicia) within metadata to indicate that the OTD references data within itself. Subsequent memory handling could be performed identically to OTD handling as described above. More directly, as should be reiterated, the administrative and codebase aspects of the TR, ATR, and HTR remain substantially identical. In other words, the software drivers can open and/or close pipes without regard to the underlying selection of TR, ATR, or HTR.

Virtualized Data Structure Optimizations

Figure 7:
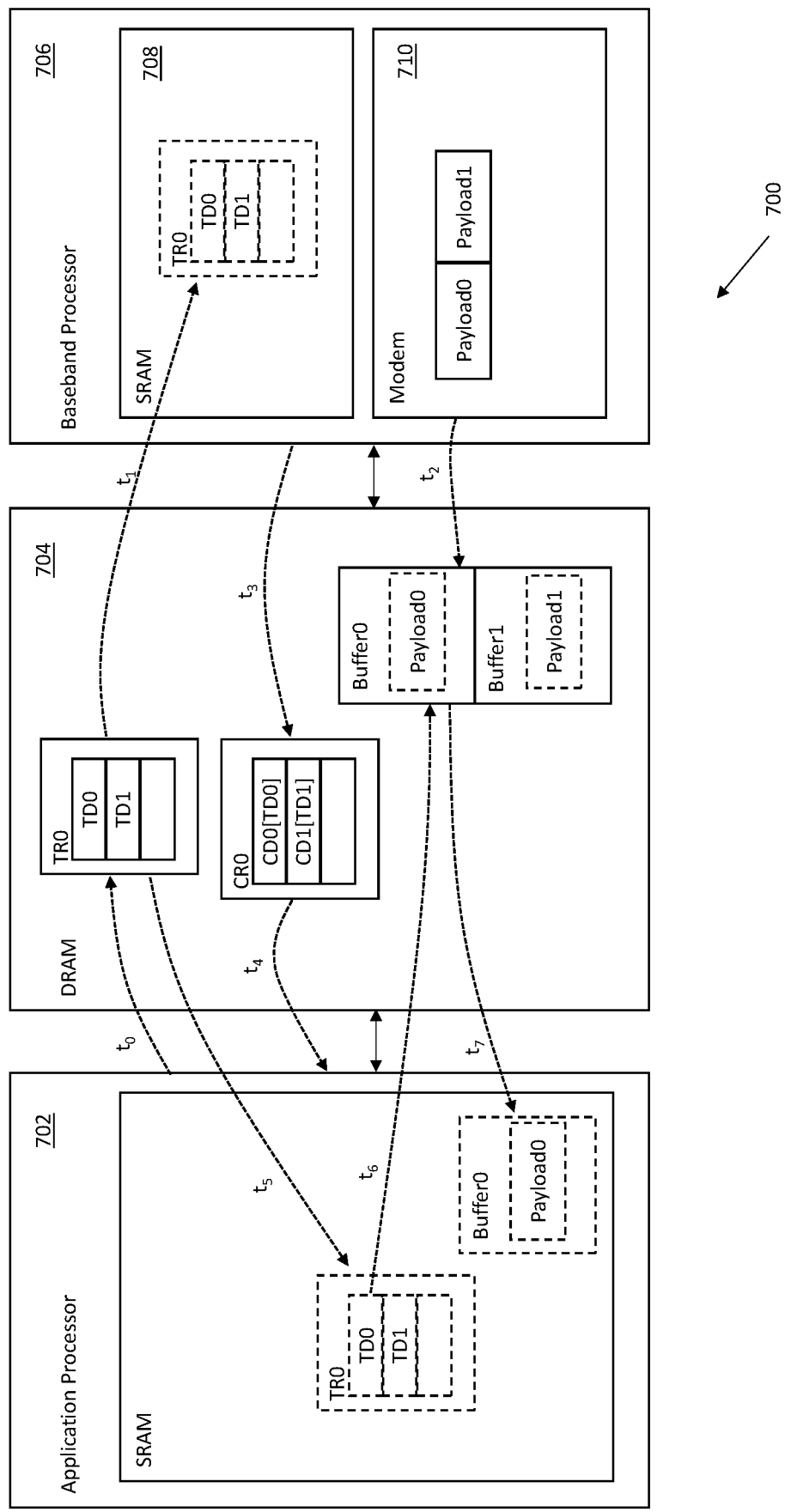
FIG. 7 is a logical representation of one exemplary apparatus performing data transfers, useful for illustrating various principles described herein.

As a brief aside, FIG. 7 is a logical representation of a baseband processor preparing data payloads for data transfer, in accordance with existing inter-processor communications.

In this example, the baseband processor 706 has received downlink payloads in its modem 710 for application processor 702. In order to allocate buffers for receiving the payloads, the application processor apparatus opens a downlink pipe (TR0), allocates DRAM memory 704 (at time $t_0$) and "rings" the baseband processor's doorbell.

Responsive to the doorbell signaling, the baseband processor apparatus 706 reads TR0 and stores a version in its local SRAM 708. The baseband processor apparatus 706 identifies and de-references pointers to the relevant buffers identified by e.g., TD0 and TD1 (at time $t_0$. The baseband processor writes its payloads into the relevant buffers (Payload0, Payload1) at time $t_2$. As each of the payloads are written to the relevant buffers, the baseband processor apparatus 706 provides completion data at time $t_3$. The completion data is retrieved by the application processor at time $t_4$.

Thereafter, the application processor 702 can retrieve the payloads (for example, using the scheme described in e.g., FIG. 5, discussed in greater detail supra). In brief summary, the application processor 702 retrieves TR0 at time $t_5$, de-references TD0 at time $t_6$, and retrieves Buffer0 at time $t_7$. These steps are repeated to transfer Buffer1.

The foregoing discussion of FIG. 7 illustrates existing techniques for small data transfers. However, various embodiments of the present disclosure may further modify completion signaling to enable so-called "virtualized" data structure operation. As used herein, the term "virtual" and "virtualized" refers to, without limitation, an empty (or null) data structure that is accessed according to recognized formatting and/or schema. For example, a "virtualized" transfer descriptor ring (VTR) is accessed with the similar protocols to a transfer ring (TR) (e.g., opening, closing, etc.). However, the VTR is empty, null, or non-existent and thus cannot be read or written to. Instead, the VTR signaling is used to identify transactions that can be provided via an optional header/footer of a corresponding completion ring.

Figure 8:
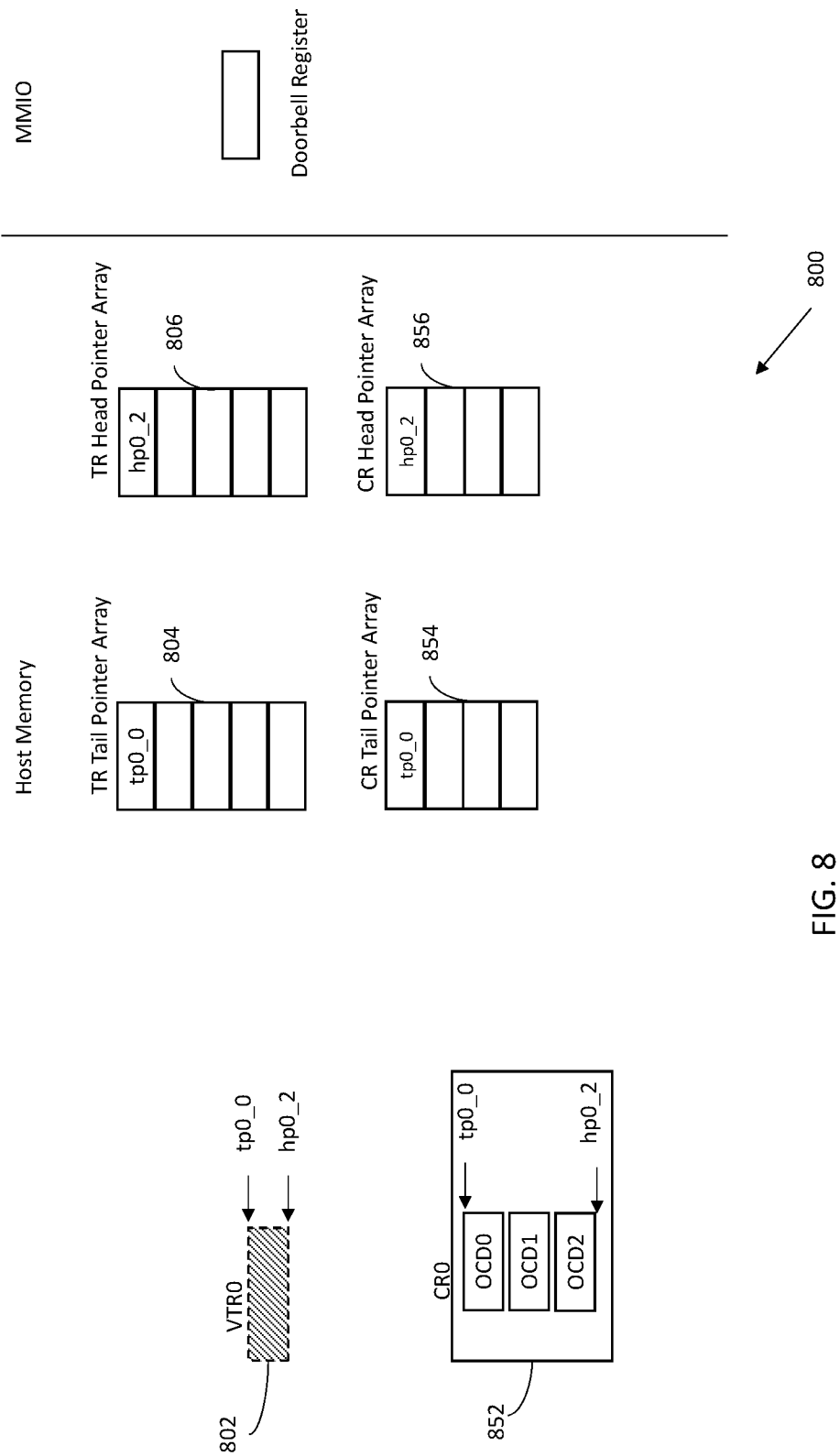
FIG. 8 is a logical block diagram of one exemplary virtualized transfer descriptor ring (VTR), in accordance with the various principles described herein.

Referring now to FIG. 8, one exemplary embodiment of a Virtualized Transfer Descriptor Ring (VTR) is presented. As shown, VTR0 802 is empty and does not create or include any transfer descriptors (TD) within a backing memory allocation. However, VTR0's corresponding entries within the TR_TIA 804 and TR_HIA 806 identify a transfer pipe of three (3) elements in size (e.g., tp0_0 and hp0_2).

VTR0 802 is completed with a completion ring (CR) CR0 852. CR0 852 is associated with CR_TIA 854 and CR_HIA 856; CR0 includes a completion pipe of three (3) elements in size (e.g., tp0_0 and hp0_2). The completion elements directly correspond to the virtualized (non-existent) elements of VTR0 802. Unlike normal completion elements however, CR0 uses optional completion descriptors (OCDs) that include the small data payload within an optional header/footer field. In other words, rather than providing over OTDs via other transfer descriptor ring type structures (TR, ATR, HTR) which require backing memory, the OCDs can be included only within the completion ring CR0.

Figure 9:
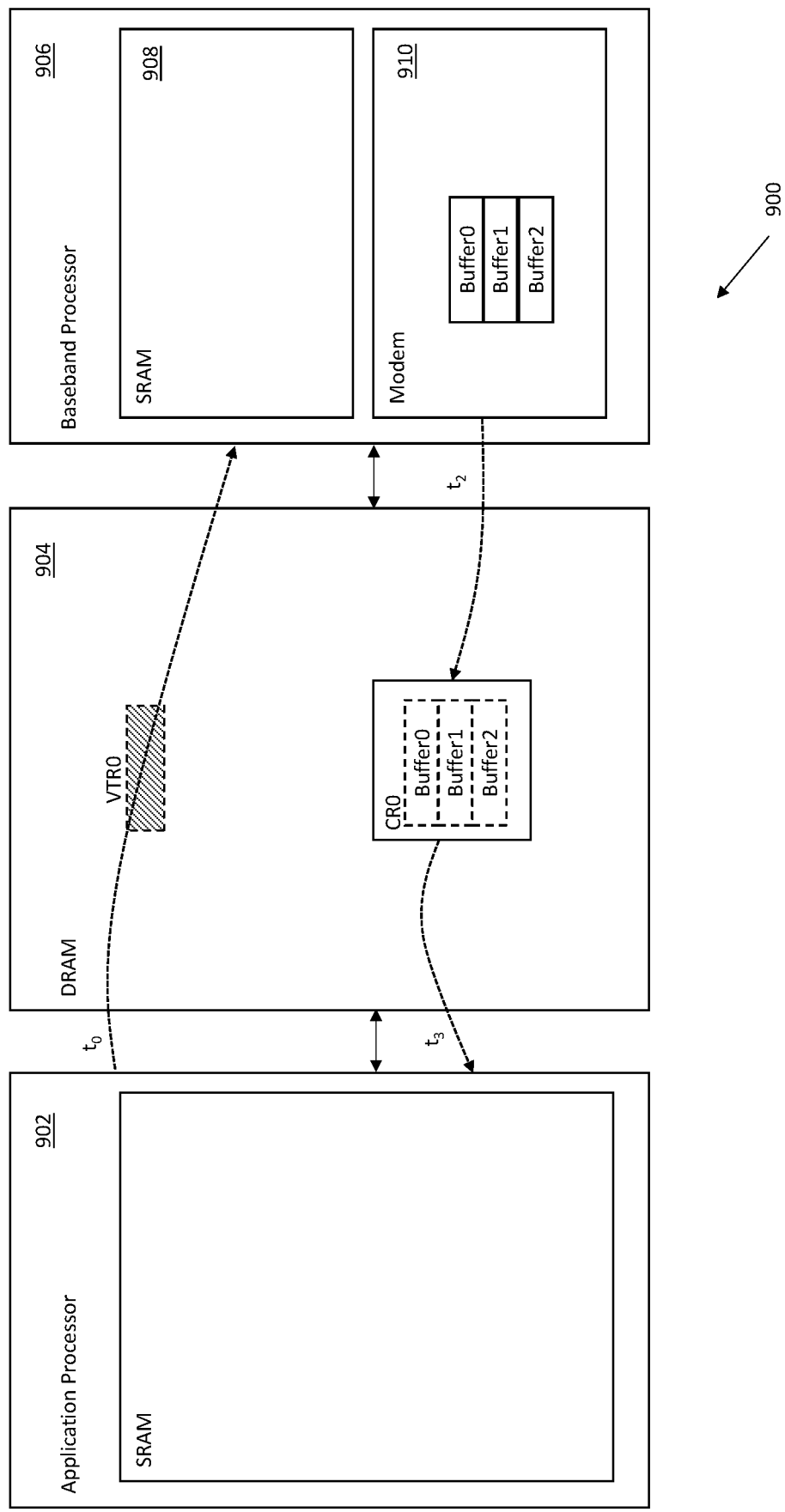
FIG. 9 is a logical representation of one exemplary apparatus performing data transfers via the exemplary data structures of FIG. 8, in accordance with the various principles described herein.

FIG. 9 is a logical representation of one exemplary apparatus 900 using virtualized data transfers for small data transactions.

In this example, the baseband processor 906 has received small downlink data payloads within modem 910 for application processor 902. The application processor 902 opens a downlink virtual pipe (VTR0) (at time $t_0$) with a null data structure. Unlike the system of FIG. 7, the application processor 902 does not allocate any backing memory to VTR0 in DRAM memory 904 (there is no corresponding time $t_1$). Only the head and tail array indices for VTR0 are written by the application processor 902.

Responsive to the doorbell signaling, the baseband processor apparatus 906 reads head and tail array indices for VTR0. In this example, the baseband processor apparatus 906 determines that VTR0 "includes" three (3) non-existent elements. As a result, at time $t_2$, the baseband processor 906 can store the contents of Buffer0, Buffer1, and Buffer2 to the corresponding OCDs included within CR0. For example, OCD0 includes the contents of Buffer0 within its optional header/footer, etc. Subsequently thereafter, CR0 and its associated OCDs are retrieved by the application processor at time $t_3$.

In one exemplary embodiment, each OCD can support a maximum size of $2^8 \times 4B = 1$ KB (i.e., 8 Kb). As previously noted, some memory allocations in DRAM could be handled with a variety of different transactional techniques. Consequently, exemplary embodiments may intelligently select between different transactional techniques so as to optimize for e.g., frequency, priority, memory consumption, power consumption, processing complexity, network bandwidth, cache efficiency, and any number of other considerations.

Additionally, as noted above, the application processor can specify to the baseband processor the number of entries within the VTR. Notably, the number of entries for a VTR is irrelevant with regard to the application processor's operation (since each entry is null); however, the baseband processor assigns a corresponding number of optional completion descriptors (OCDs). More directly, the application processor can adjust and/or moderate the data flow from the baseband processor by allocating a greater or fewer number of records for a VTR (and the resulting OCDs). When the baseband processor is out of OCDs, it must wait for a new allocation in order to transmit more data. This can be particularly useful for the application processor to exert some control (indirectly) on the baseband processor. For example, the application processor can assign a limited number of VTRs to prevent the baseband processor from consuming too much of the overall IPC bandwidth. As a related benefit, since the VTRs are not backed by any corresponding memory allocation, VTR minimally affects other application processor memory usage.

Still other variations of the foregoing will be readily appreciated by those of ordinary skill in the related arts given the contents of the present disclosure.

Methods

Figure 10:
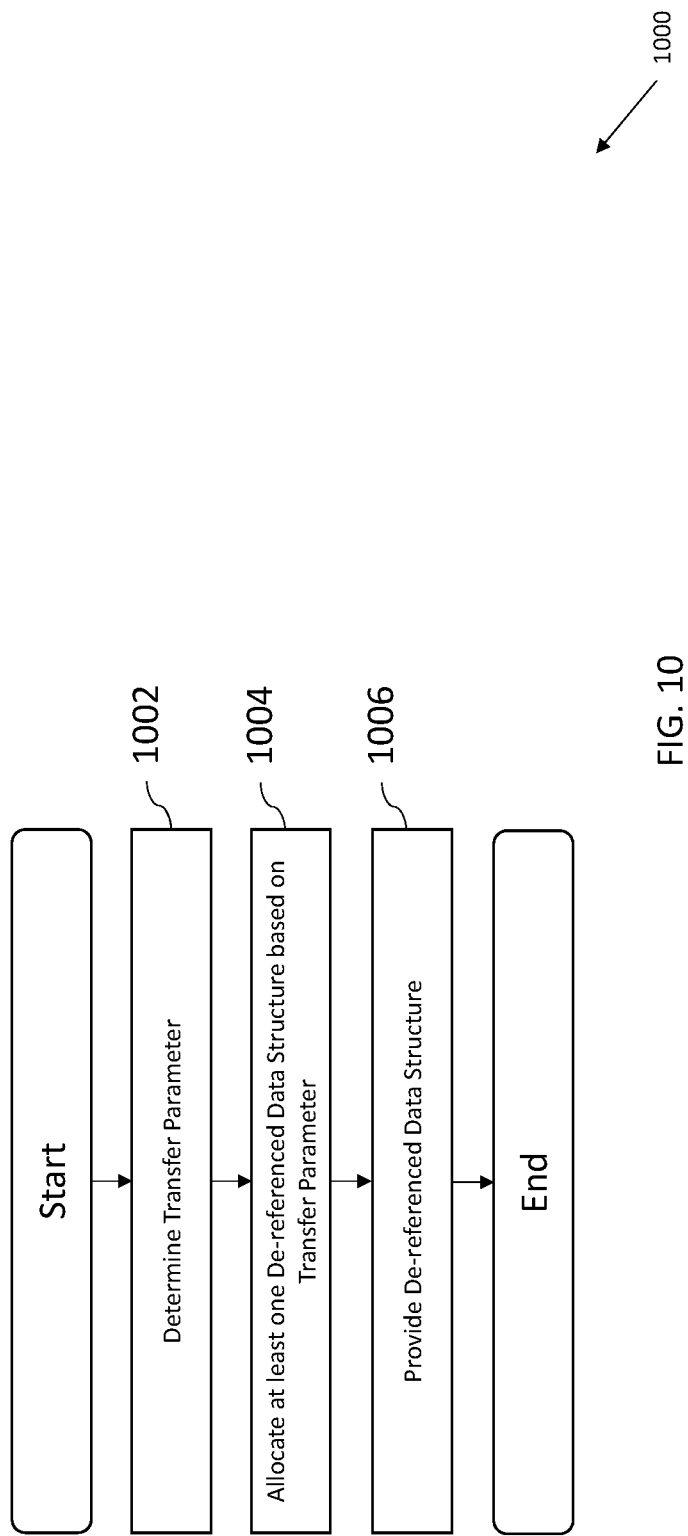
FIG. 10 is a logical flow diagram of one generalized method for transferring data between a first and a second processor apparatus, in accordance with the various principles described herein.

FIG. 10 illustrates one generalized method 1000 for transferring data between a first and a second processor apparatus.

At step 1002, the first processor determines a transfer parameter associated with a data payload. In one embodiment, the transfer parameter identifies one or more numerical, enumerated, or other discrete factors that constrain the transfer of the data payload. Common examples of a transfer parameter include without limitation, size, type, source, destination, timing, latency, throughput, bandwidth, memory, power consumption, etc.

In one exemplary embodiment, a first processor identifies a transfer size. For example, the processor determines that a data payload does not exceed 2 Kb or 8 Kb of data. In other examples, the processor determines that a data payload is scheduled for transfer at a particular time and/or with a heightened priority. In still other examples, the processor may determine that a data payload will be frequently transferred, or that the data payload is otherwise suitable for short term caching.

In some implementations, the determination is based on one or more metadata associated with the data payload. For example, during operation the first processor can read metadata that identifies a total length of the data payload. In other examples, the first processor can read metadata that identifies a total number of memory buffers associated with the data payload and infer or calculate a maximum (if not exact) data transfer size. Still other examples may allow a processor to identify a type of data (e.g., audio/visual media) or endpoint application for the data, and infer a transfer parameter therefrom (e.g., maximum latency, minimum throughput, etc.) Still other types of metadata may expressly identify transfer parameters; for example, some data payloads may be associated with e.g., a minimum quality of service (QoS) or other parameters set by higher layer software applications.

The determination may be based on the contents of the data payload, in whole or in part. In one such implementation, the processor retrieves the data to be transferred and parses or "sniffs" the data for relevant transfer parameters. For example, the processor may read the data payload to identify that the data payload is associated with e.g., TCP/IP data or UDP/IP data, each of which corresponds to different transfer parameters. Still other variants may identify certain data formats that identify transfer parameters.

The transfer parameters may be determined based on one or more processor considerations. For example, the processor may have constraints regarding processing priority, memory usage, cache efficiency, power consumption, performance, and/or any number of other operational considerations. For example, a processor may dynamically assess its memory and/or cache capacity for supporting traditional, augmented, hybridized, and/or virtualized data structures. During such operation, the processor may scale up virtualized data transfers from 2 Kb up to 8 Kb when memory resources are available, and/or scale traditional, augmented, hybridized, and/or data transfers down to 1 Kb when such resources become scarce. In another such example, the processor may prioritize data transfer activity over other unrelated activities by seeking to allocate more memory resources thereto (and commensurately larger traditional, augmented, hybridized, and/or data structure transfers); similarly when prioritizing other applications over data transfers the processor may preferentially allocate more memory resources to other applications rather than data transfers.

Additionally, in some cases, the determination of transfer parameters may also be based on considerations of other processors and/or other logical recipients. For example, the processor may consider other entities' constraints regarding processing priority, memory usage, cache efficiency, power consumption, performance, and/or any number of other operational considerations. In one such example, a first processor may be aware of a second processor's memory constraints and/or processing load and seek to either offload computational burden onto or away from the second processor. In another such example, the second processor may be constrained by e.g., network congestion or other factors outside of either the first or second processor's control; under such conditions, the first processor may determine one or more transfer parameters based on the performance limiting link downstream (here, the link between the second processor and the network).

In some embodiments, the transfer parameter may be determined based on one or more application considerations. For example, consider a voice application that generates voice data packets at an application processor for transmission by a baseband processor to a network, such as is described in commonly owned U.S. patent application Ser. No. 15/865,638 entitled "METHODS AND APPARATUS FOR REDUCED-LATENCY DATA TRANSMISSION WITH AN INTER-PROCESSOR COMMUNICATION LINK BETWEEN INDEPENDENTLY OPERABLE PROCESSORS" and filed Jan. 9, 2018, incorporated herein by reference herein in its entirety. During such operation, the underlying voice application may dynamically change one or more application functions and/or adapt to varying application considerations (e.g., voice quality, error rate, etc.). As a result, one or more transfer parameters (e.g., size of voice packets) may be adjusted so as to compensate for the dynamic conditions thereof.

Still other considerations may be made, based on e.g., external factors to the device (e.g., network bottlenecks, etc.) While many applications are performance limited based on various internal device considerations (e.g., processing power, memory, power consumption, etc.), some applications may be performance limited due to external factors. Common examples of external factors include peer device limitations (e.g., processing power, memory, power, etc.), intermediary device/network device limitations (bandwidth, latency, throughput, etc.), environmental factors (temperature, humidity, interference, etc.), and/or business requirements (e.g., permissions, cost, opportunity cost, etc.). Various other external considerations may be readily understood by those of ordinary skill in the related arts given the contents of the present disclosure.

In one embodiment, the data payload may be application data. For example, a user application may open a data pipe to transfer user data via e.g., transfer descriptors (TDs) and transfer descriptor rings (TR) and/or augmented, virtualized, or hybridized versions thereof. In other embodiments, the data payload may be control data. For example, a user space and/or kernel space application may open a completion pipe to affirmatively acknowledge the receipt of user data via e.g., completion descriptors (CDs) and completion descriptor rings (CR).

At step 1004, at least one de-referenced data structure is allocated based on the transfer parameter. In one embodiment, the at least one de-referenced data structure includes one or more constituent data structures. In one such example, the at least one de-referenced data structure is a nulled virtualized transfer descriptor ring (VTR) which is empty. In another such example, the at least one de-referenced data structure is an augmented transfer descriptor ring (ATR) which includes one or more optional transfer descriptors (OTDs).

In one embodiment, at least one data structure is allocated in response to the at least one de-referenced data structure. In one such variant, a completion descriptor ring (CR) is allocated for another processor in response to a virtualized (null) data structure. In one such variant, the CR includes one or more optional completion descriptors (OCDs). In another embodiment, one or more data structures are allocated that include one or more constituent de-referenced data structures. In one such example, the at least one de-referenced data structure is a hybridized transfer descriptor ring (HTR) which includes one or more transfer descriptors (TDs) and one or more optional transfer descriptors (OTDs).

In one exemplary embodiment, the data payload is only allocated to de-referenced type or value type data structures. In an alternative embodiment, the data payload is allocated a first portion of de-referenced or value type data structures and a second portion of referenced type data structures. As previously noted, so-called "value" data types are data types that include one or more values; whereas "reference" data types are interpreted by logic to "refer" to other data.

In one exemplary embodiment, the allocation includes selecting between allocating data structures, augmented data structures, optional data structures, and/or virtual data structures based on the transfer parameter. In one such variant, the augmented and/or optional structures do not require de-referencing; instead such data structures includes the data payload as value data types directly within the virtual data structure. In one such variant, the virtual structures do not require de-referencing because they are null data. In another embodiment, a so-called "hybrid" data structure is selected for allocation that may include both reference and value data types.

In one exemplary variant, the data structures, virtual data structures, and/or hybrid data structures use the same schema for e.g., organizing, storing, accessing, and/or modifying the data stored within (or referenced thereby). For example, in one such implementation, the data structure, augmented data structure, and/or hybrid data structure are ring buffers that prescribe data reads and writes in a single direction, and "wrapping" from end-to-start. In other variants, the data structures, virtual data structures, and/or hybrid data structures use different schemas for e.g., organizing, storing, accessing, and/or modifying the data stored within (or referenced thereby).

In another such implementation, the data structure and virtualized data structure prescribe completion of data transactions. For example, in one such implementation, the data structure is a ring buffer and the virtual data structure is null data, both of which trigger completion data responses. Various other combinations of data structures may be substituted by those of ordinary skill with equivalent success, given the contents of the present disclosure.

In one exemplary embodiment, the allocation includes selecting between allocating a transfer descriptor ring (TR), a virtual transfer descriptor ring (VTR), an augmented data structure (ATR), and/or a hybrid data structure (HTR) based on the transfer parameter. In another embodiment, the allocation includes selecting between allocating a transfer descriptor (TD), an optional transfer descriptor (OTD) and a virtual transfer descriptor (VTD) (null data) based on the transfer parameter.

In one exemplary embodiment, the allocation includes selecting between allocating a completion descriptor ring (CR) and an augmented transfer descriptor ring (ATR) based on the transfer parameter. In another embodiment, the allocation includes selecting between allocating a completion descriptor (CD) and an optional completion descriptor (OCD) based on the transfer parameter.

In one embodiment, different data types use different memory size allocations. For example, a transfer descriptor (TD) that refers to a memory buffer may be allocated 2 Kb of space whereas an optional transfer descriptor (OTD) or optional completion descriptor (OCD) that includes an optional header/footer may be allocated up to 8 Kb. In other embodiments, different data types use the same memory size allocation. For example, allocated space for TDs, OTDs, or OCDs may be limited to 2 Kb of space (inclusive of any optional header/footers).

In some embodiments, memory is allocated by a host processor. In other embodiments, memory is allocated by a peripheral processor. In still other embodiments, memory may be allocated by an external memory controller. Memory allocations may be performed over one or more memories. For example, a processor may reserve memory allocations within a DRAM. In some cases, a processor may also reserve memory within a SRAM local cache. In one such variant, memory allocations are protected regions of memory that cannot be overwritten by other processes and/or other processors. For example, a memory allocation in host memory is actively managed and protected by the host memory management. In another example, a locally cached SRAM allocation may be excluded from typical cache memory management. Such implementations may offer improved protection and access times for the transfer data structure; however, reducing the cache area may detract from cache efficiency (e.g., a smaller effective cache may result in more cache misses). In other such variants, memory allocations may be transient, for example, a locally cached SRAM allocation may still be subject to normal cache memory management.

Data structures may be allocated memory size allocations dynamically. For example, dynamic allocations may be based on one or more of a increment, range, length, or other size. In one variant, allocating a OTD/OCD may be based on a size of the optional header or footer, where the optional header or footer is extendable up to 8 Kb in 4 byte (B) increments. In another example, a data structure may be dynamically sized based on the number of elements; e.g., an eight (8) element HTR with 2 Kb TD or 8 Kb OTDs would be allocated a total space of 64 Kb (e.g., to maximally accommodate OTDs). Still other variants may allocate a memory space that must be managed appropriately; e.g., a total space of 32 Kb space may be allocated of which any combination of 2 Kb TDs and 8 Kb OTDs may be allocated.

Alternatively, data structures may be allocated memory size allocations statically. For example, TDs, OTDs, and OCDs may be statically allocated 2 Kb of memory. In some cases, fixed allocations may be semi-statically changed (e.g., a TD size may be changed for specific operation to e.g., 1 Kb, 2 Kb, 4 Kb, 8 Kb, etc.)

In one embodiment, the transfer parameters include a transfer size. In some variants, the transfer size may be based on a minimum and/or maximum threshold. For example transfers that are less than a threshold may be considered "small transfers." In another example, transfers that are more than a threshold may be considered "bulk" or "large" transfers. Artisans of ordinary skill in the related arts will readily appreciate that the terms "small" and "bulk" are terms of degree, and that various different technologies may use different sizing criteria of either qualitative or quantitative degree (e.g., small, medium, large, 1 Kb, 2 Kb, 4 Kb, etc.)

Various embodiments of the present disclosure may use transfer categories with overlapping or non-overlapping ranges. For example transfers that are less than 2 Kb may be considered "small transfers," while transfers above 8 Kb may be considered "bulk" or "large" transfers. Transfers in an overlapping range between 2 Kb and 8 Kb may be treated as either small or bulk transfers based on other transfer considerations. As previously alluded to, selecting between null, reference, and value data types within the context of different data structures can be tuned so as to maximize the overall performance. For example, providing 4 Kb of data within an augmented transfer ring (ATR) may be suitable for situations where there are significant benefits e.g., shorter latency or caching efficiencies; however in other situations (e.g., where the data is latency tolerant, or where the cache is better utilized for other applications), the 4 Kb of data may be handed within a transfer descriptor ring (TR) that references transfer descriptors (TDs). Similarly, providing 0 Kb (null) data within a virtual transfer ring (VTR) in order to receive data via Optional Completion Descriptors (OCDs) may be suitable for situations where there are significant benefits to reducing transactional overhead; however, in other situations (e.g., where multiple processors may need to access the same OCD, etc.) the transfer may be better served with a memory backed transfer ring (TR).

Transfer parameters may include application considerations. Application considerations may be user space or kernel space. Common examples of application considerations include latency, throughput, bandwidth, and/or reliability. More directly, different applications may require or prioritize different data characteristics such as time, amount, and/or amount per unit time. For example, streaming media applications may prioritize time, whereas file transfers may prioritize the amount of data transferred. In other examples, user space applications may be prioritized over kernel space applications (e.g., usually non-critical tasks that improve overall network efficiency) so as to maximize user specific functionality thereby improving user experience.

In one embodiment, the transfer parameters include transactional overhead. As previously alluded to, reference data types can be used to support arbitrarily sized data, however there is some transactional overhead associated therewith (e.g., de-referencing, retrieval, etc.) In contrast, null, value, and non-reference data types can be used immediately, and may also be cached for subsequent use thereafter. As a result, null, value, and non-reference data types may be preferable where transactional overhead is undesirable and/or where caching is desirable. Reference data types may be preferable where the transactional overhead associated with de-referencing the data is either defrayed over the size of the transfer or is not a priority for e.g., performance.

In related embodiments, the transfer parameters may include memory considerations and/or processing complexity. As previously noted, most systems implement a multi-tiered memory architectures to improve overall performance. For example, different tiers of memory may be suited to faster accesses or more cost/power efficient accesses. Some implementations may use null, value, and non-reference data types where memory consumption is not a primary consideration and/or processing complexity is undesirable. Reference data types may be preferable where memory is a constraint.

Various other transfer parameters may be substituted with equal success by artisans of ordinary skill in the related arts, given the contents of the present disclosure.

In some embodiments, multiple transfer parameters may be considered in combination order to determine the optimal allocation. Different considerations may be weighted or assessed together. For example, larger transfer sizes (e.g., 8 Kb) may be suitable for virtualized data structures for prioritized applications that require low transfer latencies. In another example, smaller transfer sizes (e.g. 4 Kb) may be suitable where performance is not at issue and overall processing burden is high.

Some embodiments of the present disclosure may manage data structures within memory management logic. During operation, the data structure is instantiated as a null, value type, or reference type data structure by the memory management logic. In such implementations, the memory management logic may independently track (and ensure) that the data structure is appropriately treated. In one such implementation, the memory management logic creates and/or destroys pipes based on a software function call. During the creation of the pipe, the memory management logic tracks whether or not the pipe is virtual, augmented, or memory backed. For example, when a first processor opens a pipe, the first processor can specify that the pipe is backed with memory (e.g., the pipe is a transfer descriptor ring (TR)) or an augmented transfer descriptor ring (ATR), or alternatively that the pipe is not backed with memory (e.g., the pipe is a virtual transfer descriptor ring (VTR)). In one such implementation, a specific bit is used to indicate whether a data structure is a virtualized, augmented, or not.

Other embodiments of the present disclosure may additionally include one or more indicia within the data structure that identify whether the data structure includes null data, value type data, and/or reference type data. Common examples of indicia include without limitation: tags, flags, headers, footers, metadata, and/or any other data structure or formatting schema. In some variants, the one or more indicia may further identify which portions of the data structure include value type data and/or reference type data. In other words, a specific bit within a header or footer may be used to indicate whether the data structure includes an optional or augmented data structure. For example, in a hybridized transfer descriptor ring (HTR), one or more flags may be included within each record to identify whether the record is a transfer descriptor (TD) or an optional transfer descriptor (OTD).

At step 1006, the at least one de-referenced data structure is provided to the second processor. In one exemplary embodiment, the provisioning of the transfer data structure includes writing the data structure to a shared memory. In still other embodiments, the provisioning of the transfer data structure includes writing the data structure to a buffer memory. In another such embodiment, the provisioning of the transfer data structure includes writing the data structure to the second processor's memory.

In other embodiments, the provisioning of the transfer data structure includes a physical bus access (e.g., writing over a data bus). In some such variants, the provisioning of the transfer data structure is performed over a memory bus. In other such variants, the provisioning is performed over a serial bus. In still other variants, the provisioning is performed over a parallel bus.

In some embodiments, the provisioning may include an explicit notification signaling. For example, in some implementations the first processor fires an interrupt for the second processor. In another example, the first processor may write to a general purpose input output (GPIO). In still other examples, the first processor may write to one or more registers or other defined memory locations.

In other embodiments, the provisioning may be implied to the second processor. For example, the first processor may write to an array. For example, in one such implementation, the first processor writes to a head index array and/or a tail index array that identify one or more transfer data structures. The head and/or tail index array points to the locations within transfer data structure that are populated with data ready to transfer. The second processor can infer, based on changes to the pointer arrays, that new data structures are available for transfer. In another implementation, the first processor writes to a head index array and/or a tail index array that identify one or more completion data structures. The head and/or tail index array points to the locations within a transfer data structure that have/have not yet been completed (i.e., which still have data for transfer). The second processor can infer, based on changes to the pointer arrays, that new data structures are available for transfer.

In another such embodiment, the provisioning of a "null" transfer data structure includes the provisioning of one or more completion (response) data structures. In still other implementations, the provisioning of a "null" transfer data structure triggers one or more other responsive activities by another external entity.

For example, null provisioning may instruct another second processor to respond via a completion data structure. For example, the first processor may write to a head index array and/or a tail index array that identify one or more null transfer data structures. The head and/or tail index array point to null locations (e.g., 00, etc.) The second processor can infer, based on the number of elements of a null structure, that one or more response structures can be allocated for transfer. As a result, the processor writes one or more completion structures with a response. Thereafter, the processor writes to a head index array and/or a tail index array that identifies the responsive one or more completion data structures.

Figure 11:
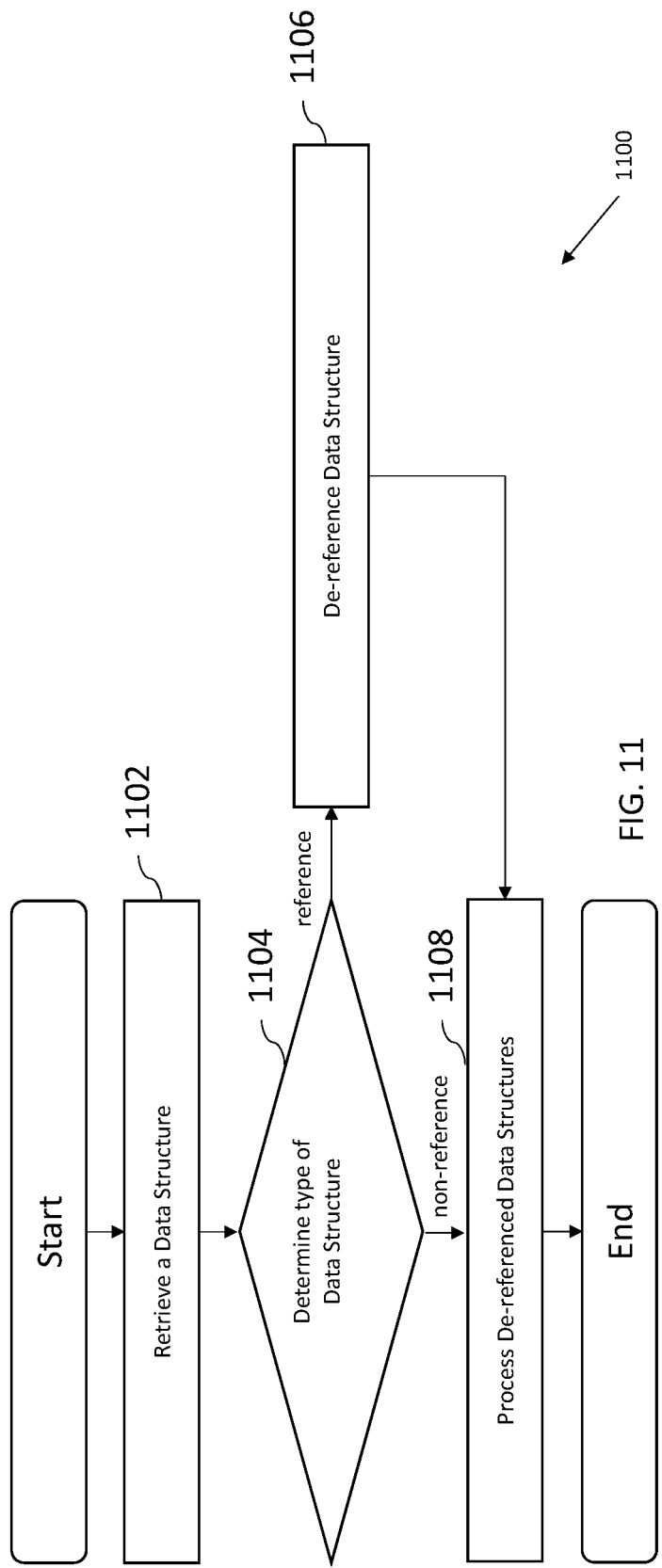
FIG. 11 is a logical flow diagram of one generalized method for servicing a data transfer between a first and a second processor apparatus, in accordance with the various principles described herein.

FIG. 11 illustrates one generalized method 1100 for processing one or more small data payloads.

At step 1102, at least one data structure is retrieved. In one exemplary embodiment, the retrieval includes reading the data structure from a shared memory. In other embodiments, the retrieval includes reading the data structure from a buffer memory. In another such embodiment, the retrieval includes reading the data structure from a processor's local memory (or another processor's memory).

In other embodiments, the data structure can be retrieved from a physical bus access. In some such variants, retrieval is performed over a memory bus. In other such variants, the retrieval is performed over a serial bus. In still other variants, the retrieval is performed over a parallel bus.

In one embodiment, the processor retrieves the data structure responsive to either explicit or implicit notification. Examples of explicit notification include e.g., interrupt, GPIO, and/or other messaging. Examples of implied notification include e.g., inferences based on changes to data structures.

In some embodiments, the processor may retrieve the data structure based on one or more processor considerations. For example, the processor may (upon determining that a data structure is available) determine whether or not the processor can wait to retrieve the data. In some variants, the determination is based on one or more of the processor's power consumption, task priority, current tasks, expected tasks, processor capability, memory availability, and/or any number of other processor considerations. In other embodiments, the determination is based on one or more external factors. For example, the processor may be unable to connect to a broader network (due to network scheduling and/or network congestion). Under such circumstances, the processor may wait to retrieve the data structure until the network connectivity issue has passed.

At step 1104, the processor determines a data type of the data structure. In one exemplary embodiment, the processor determines whether the data structure is a null type data structure, reference type data structure, or a value type data structure. In some variants, the processor may determine whether a data structure included within the data structure (e.g., a transfer descriptor (TR) included within a hybrid transfer descriptor ring (HTR)) is a null type data structure, reference type data structure, or a value type data structure.

In one embodiment, the data type associated with the data structure is provided by memory management logic of the processor. For example, a pipe that was opened as a data structure is treated by default as a reference data type data structure, in contrast a pipe that was opened as an augmented or optional data structure is treated as an in-line value data type data structure. In another such example, a pipe that was opened as a virtual data structure is treated by default as a null type data structure.

In other embodiments, the data structure includes one or more indicia within the data structure that identify whether the data structure includes null type data, value type data, and/or reference data. For example, the data structure may include an optional header that identifies the presence of an optional header/footer or vice versa. Various other methods for identifying data types of a data structure may be substituted with equivalent success by those of ordinary skill in the related arts, given the contents of the present disclosure.

If the data structure is a reference data type, then the processor de-references the reference data type to obtain the de-referenced data structures at step 1106. Otherwise, if the data structure is a value or non-reference data type, then the processor can process the de-referenced data structures at step 1108.

In some embodiments, if the data structure is a null type data structure, the processor responds with a unidirectional response. For example, a processor can respond with completion data in response to a null transfer descriptor.

During de-referencing, one or more backing memory structures that are referenced by the reference data structure are copied to local memory. For example, a memory buffer that is referred to by a transfer descriptor (TD) of a transfer descriptor ring (TR) may be copied to local memory. In some embodiments, the backing memory buffer is copied into a local SRAM cache. In other embodiments, the backing memory buffer is copied into a host memory and/or shared memory.

In some embodiments, a data structure may be de-referenced in whole or in part, if at all. In one variant, a hybrid data structure that includes both reference and value data types may only require de-referencing for the reference value types. For example, a hybrid data structure may only require that reference data type records are de-referenced. In another example, a hybrid data structure may enable processing on only the records that are value data types, without requiring that the reference data type records are de-referenced.

In one exemplary embodiment, processing the one or more de-referenced data structures includes transmitting the payload of the data structures via e.g., a wired or wireless interface. For example, the baseband processor may respond with a payload within an optional completion data structure (in whole or in part). In another such example, the processor apparatus of a user device may wirelessly transmit a payload of a data structure (in whole or in part) to another device external to the user device, such as a wireless peripheral device (e.g., mouse, keyboard, earbuds, smart home device), another processor (e.g., a third processor other than a host or a peripheral), and/or an access point.

In other embodiments, processing the one or more de-referenced data structures includes processing the payload within a media application for e.g., playback, capture, and/or rendering. Common examples of media applications include audio codec operation, video codec operation, human interface operation (e.g., touchscreen, keyboard, mouse, headset, and/or any other human interface peripheral). Persons having ordinary skill in the relevant art will recognize that various media interfaces may be enabled depending on the hardware (e.g., displays, speakers, microphones, and human interface elements, both indigenous to the device and/or externally coupled to the device).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of data transfer between a first independently operable processor apparatus and a second independently operable processor apparatus, the method comprising:
    based at least on a transfer parameter of at least one data payload from among a plurality of data payloads meeting a prescribed criterion:
        providing a virtualized data structure and a plurality of indices that identify a plurality of elements of a null data structure via a shared memory accessible by the first independently operable processor apparatus and the second independently operable processor apparatus;
        based at least on identifying the null data structure, causing one of the first independently operable processor apparatus or the second independently operable processor apparatus to write a completion data structure for each element of the null data structure from among the plurality of elements of the null data structure to provide a plurality of completion data structures to the shared memory, the plurality of data payloads being contained within a plurality of optional fields of the plurality of completion data structures; and
        obtaining the plurality of data payloads via retrieval of the plurality of completion data structures from the shared memory.

2. The method of claim 1, further comprising enabling the second independently operable processor apparatus to read the plurality of indices.

3. The method of claim 1, wherein the plurality of optional fields comprises headers or footers of the plurality of completion data structures.

4. The method of claim 1, wherein the transfer parameter of the at least one data payload meeting the prescribed criterion comprises a size of the at least one data payload not exceeding a maximum size.

5. The method of claim 4, wherein the maximum size corresponds to eight (8) kilobits.

6. The method of claim 4, wherein the maximum size corresponds to two (2) kilobits.

7. The method of claim 1, wherein the data transfer comprises a data transfer from the second independently operable processor apparatus to the first independently operable processor apparatus, and
    wherein the providing of the virtualized data structure via the shared memory comprises transferring the virtualized data structure directly to the second independently operable processor apparatus.

8. A multi-processor apparatus, comprising:
    a first independently operable processor;
    a second independently operable processor configured to perform data communication with the first independently operable processor; and
    a shared memory apparatus accessible by the first and second independently operable processors,
    wherein the first independently operable processor is configured to write a plurality of indices into the shared memory that identify a plurality of elements of a null data structure, and
    wherein the second independently operable processor is further configured to:
        receive a plurality of downlink payloads via a baseband modem, and
        based on at least one transfer parameter of at least one of the plurality of downlink payloads meeting one or more prescribed criteria, transfer a completion data structure for each element of the null data structure from among the plurality of elements of the null data structure to provide a plurality of completion data structures to the first independently operable processor via the shared memory apparatus, the plurality of completion data structures comprising a plurality of fields containing the plurality of downlink payloads.

9. The multi-processor apparatus of claim 8, wherein the transfer of the plurality of completion data structures to the first independently operable processor is further based on receipt, via the shared memory apparatus, of the null data structure from the first independently operable processor.

10. The multi-processor apparatus of claim 8, wherein the the plurality of fields comprise dynamically enabled optional footers or optional headers of the plurality of data structures, the optional footers or the optional headers having sizes based at least in part on sizes of the plurality of downlink payloads.

11. The multi-processor apparatus of claim 8, wherein the at least one transfer parameter of the at least one downlink payload meeting the one or more prescribed criteria comprises a size of the at least one downlink payload not exceeding a maximum size.

12. The multi-processor apparatus of claim 11, wherein the second independently operable processor is further configured to, based at least on the size of the at least one downlink payload exceeding the maximum size, transfer the plurality of completion data structures to a data structure array within the shared memory apparatus, the transfer of the plurality of completion data structures enabling the first independently operable processor to retrieve the plurality of downlink payloads from the plurality of fields.

13. The multi-processor apparatus of claim 8, wherein the at least one transfer parameter of the at least one downlink payload meeting the one or more prescribed criteria comprises a size of the at least one downlink payload being within a range of prescribed transfer sizes.

14. The multi-processor apparatus of claim 13, wherein the at least one transfer parameter comprises at least one of:
   (i) a processing resource associated with the multiprocessor apparatus,
   (ii) an application associated with the plurality of downlink payloads, and
   (iii) a memory size.

15. A method of data transfer to a first independently operable processor apparatus from a second independently operable processor apparatus, the method comprising:
   receiving a data structure and a plurality of indices via a shared memory accessible by the first independently operable processor apparatus and the second independently operable processor apparatus;
   based at least on a determination that the plurality of indices identify a plurality of elements of a null data structure that lacks a backing memory allocation, writing a completion data structure for each element of the null data structure from among the plurality of elements of the null data structure to provide a plurality of completion data structures to the shared memory, the plurality of completion data structures comprising a plurality of data payloads within a plurality of fields of the plurality of completion data structures; and
   causing the first independently operable processor apparatus to read the plurality of completion data structures and obtain the plurality of data payloads thereby.

16. The method of claim 15, wherein the writing of the plurality of completion data structures to the shared memory comprises writing the plurality of completion data structures to an array configured to contain one or more completion data structures, and
   wherein the writing of the plurality of completion data structures to the shared memory is further responsive to a determination that at least one data payload from among the plurality of data payloads does not exceed a prescribed size.

17. The method of claim 16, wherein the prescribed size comprises a maximum size set to two (2) kilobits or eight (8) kilobits.

18. The method of claim 15, wherein the writing of the plurality of completion data structures to the shared memory is further based at least on a determination that at least one data payload from among the plurality of data payloads is scheduled for transfer at a particular time.

19. The method of claim 15, further comprising receiving the data payload via a wireless modem associated with the second independently operable processor apparatus.

20. The method of claim 15, further comprising updating a tail pointer array with a tail pointer address configured to indicate to the first independently operable processor of the writing of the plurality of completion data structures.

* * * * *